United States Patent
Yin

(10) Patent No.: US 10,973,184 B1
(45) Date of Patent: Apr. 13, 2021

(54) PLANTER, GROWTH SYSTEM, AND GROWTH BLOCK FOR AEROPONIC FARMING

(71) Applicant: Deryck Yin, Glenelg, MD (US)

(72) Inventor: Deryck Yin, Glenelg, MD (US)

(73) Assignee: AMERICAN STANDARD AGRICULTURAL PRODUCTS (ASAP), Glenwood, MD (US)

( * ) Notice: Subject to any disclaimer, the term of this patent is extended or adjusted under 35 U.S.C. 154(b) by 0 days.

(21) Appl. No.: 17/018,514

(22) Filed: Sep. 11, 2020

(51) Int. Cl.
| | | |
|---|---|---|
| *A01G 31/04* | (2006.01) | |
| *A01G 31/06* | (2006.01) | |
| *A01G 31/02* | (2006.01) | |
| *A01G 9/02* | (2018.01) | |
| *A01G 27/00* | (2006.01) | |

(52) U.S. Cl.
CPC .............. *A01G 31/02* (2013.01); *A01G 9/02* (2013.01); *A01G 31/042* (2013.01); *A01G 27/003* (2013.01); *A01G 27/005* (2013.01); *A01G 27/008* (2013.01)

(58) Field of Classification Search
CPC ........ A01G 31/02; A01G 9/02; A01G 27/003; A01G 27/005; A01G 27/008; A01G 31/042; A01G 31/04; A01G 31/06
See application file for complete search history.

(56) References Cited

U.S. PATENT DOCUMENTS

| | | | | |
|---|---|---|---|---|
| 3,365,840 A | * | 1/1968 | Cooper | A01G 11/00 47/82 |
| 3,579,907 A | | 5/1971 | Graves | |
| 3,603,034 A | * | 9/1971 | Maxwell-Stewart | A01G 31/02 47/79 |
| 4,327,538 A | * | 5/1982 | Milhem | A01G 9/143 56/1 |
| 4,379,375 A | * | 4/1983 | Eisenberg | A01G 31/02 47/65 |
| 4,669,217 A | * | 6/1987 | Fraze | A01G 24/00 47/64 |
| 4,879,840 A | * | 11/1989 | den Daas | A01G 31/02 47/65 |
| 4,976,064 A | * | 12/1990 | Julien | A01G 31/02 47/63 |
| 5,010,686 A | * | 4/1991 | Rivest | A01G 31/02 47/62 C |

(Continued)

FOREIGN PATENT DOCUMENTS

| | | | |
|---|---|---|---|
| JP | 02219529 A | * | 9/1990 |
| JP | 2005021065 A | * | 1/2005 |

*Primary Examiner* — Son T Nguyen
(74) *Attorney, Agent, or Firm* — Sughrue Mion, PLLC

(57) ABSTRACT

A planter may include a housing configured to house one or more growth units, which are individual positions in the planter for growing an individual plant. The planter may include one or more liquid supply lines embedded in an upper portion of the housing, and a drain line embedded in a lower portion of the housing. A drain that is configured to remove liquid from the planter and supply the removed liquid to a pump via the drain line may also be provided. An upper surface of the housing of the planter may include, for each of the one or more growth units, a through hole that passes through the upper surface of the planter housing into the inner chamber of the growth unit.

18 Claims, 39 Drawing Sheets

(56) References Cited

U.S. PATENT DOCUMENTS

| | | | |
|---|---|---|---|
| 5,216,836 A * | 6/1993 | Morris | A01G 31/02 47/62 C |
| 5,887,383 A * | 3/1999 | Soeda | A01G 31/02 47/59 R |
| 6,807,770 B2 | 10/2004 | Wainwright et al. | |
| 6,840,007 B2 * | 1/2005 | Leduc | A01G 31/047 47/62 C |
| 7,877,927 B2 | 2/2011 | Roy et al. | |
| 8,533,993 B2 | 9/2013 | Pettibone | |
| 8,782,948 B2 | 7/2014 | Harwood et al. | |
| 9,288,951 B2 | 3/2016 | Hansen et al. | |
| 9,374,953 B2 | 6/2016 | Martin et al. | |
| 9,872,449 B2 * | 1/2018 | Ross | A01G 31/02 |
| 10,058,040 B2 * | 8/2018 | Daas | A01G 9/1423 |
| 10,660,282 B1 * | 5/2020 | Parrish | A01G 9/085 |
| 2004/0163308 A1 * | 8/2004 | Uchiyama | A01G 31/042 47/1.01 R |
| 2013/0074408 A1 * | 3/2013 | Singh | A01G 31/02 47/62 E |
| 2014/0283452 A1 * | 9/2014 | Dittman | A01G 31/02 47/62 R |
| 2015/0068122 A1 * | 3/2015 | Juncal | A01G 31/02 47/62 A |
| 2016/0324089 A1 * | 11/2016 | Miyabe | A01C 21/005 |
| 2017/0099791 A1 * | 4/2017 | Joseph | A01G 31/04 |
| 2018/0007850 A1 * | 1/2018 | Dufresne | B65G 1/026 |
| 2018/0184599 A1 * | 7/2018 | Deforche | A01G 31/042 |
| 2019/0029200 A1 * | 1/2019 | Mawendra | A01G 20/30 |
| 2019/0090433 A1 * | 3/2019 | Green | A01G 9/16 |
| 2019/0183062 A1 * | 6/2019 | Pham | A01G 31/06 |
| 2019/0208722 A1 * | 7/2019 | Fevre | A01G 31/042 |
| 2019/0261589 A1 * | 8/2019 | Pham | A01G 9/0297 |
| 2019/0335691 A1 * | 11/2019 | Krakover | A01G 31/06 |
| 2020/0196534 A1 * | 6/2020 | Spiro | A01M 21/043 |
| 2020/0229357 A1 * | 7/2020 | Spiro | A01G 9/029 |
| 2020/0305369 A1 * | 10/2020 | Ikeuchi | A01G 31/02 |

* cited by examiner

100

100A

1000

1000

PLANTER, GROWTH SYSTEM, AND GROWTH BLOCK FOR AEROPONIC FARMING

BACKGROUND

Field

The present disclosure is directed at a planter, a growth system that includes a planter, and a growth block for at least one of aeroponic farming. The present disclosure focuses on a planter, a growth system that includes a planter, and a growth block designed for easy planting, growing in an optimal environment and quick harvest and cleaning (so as to quickly turnover to a next planting process). The planter, growth system that includes a planter, and growth block are suitable for mass production.

Background

Traditional aeroponics does not use soil to grow plants. For example, the plant may be held at the top cover of the aeroponic planter. In the aeroponic planter, there may be spray nozzles, tubing and pumps. Aeroponics uses spray nozzles to deliver water and liquid nutrients in mist form to the plant roots. A recirculation pump may sit in the liquid at the bottom of the planter and send water or liquid nutrients to the spray nozzles.

In the related art, the nozzles, tubing and pumps may be located in a same space as the plant roots. This type of conventional configuration is burdensome, as it makes harvesting and cleaning process difficult (because the tubing, pipes, nozzles, etc. could get in the way) and thus increase maintenance costs. Thus, the planting, and harvest process are labor intensive. For example, when the plant shoots are removed, the roots need to be manually separated from the watering equipments and removed from the planter. This arduous harvesting process prevents the aeroponics planter process from being used for mass production.

This disclosure proposes a type of planter directed at solving the problems with the related art.

Listing of Related Art

Patent Literature 1: "Graves" U.S. Pat. No. 3,579,907 ("Automated Controlled Environment for Continuous Production of Plant Life").

Patent Literature 2: "Wainwright" U.S. Pat. No. 6,807,770 ("Low Pressure Aeroponic Growing Apparatus").

Patent Literature 3: "Roy" U.S. Pat. No. 7,877,927 ("Modular Aeroponic/Hydroponic Container Mountable to a Surface").

Patent Literature 4: "Pettibone" U.S. Pat. No. 8,533,993 ("Modular Vertical Farm Cell").

Patent Literature 5: "Harwood" U.S. Pat. No. 8,782,948 ("Modular Vertical Farm Cell").

Patent Literature 6: "Hansen" U.S. Pat. No. 9,288,951 ("Method and Apparatus for Aeroponic Growth").

Patent Literature 7: "Martin" U.S. Pat. No. 9,374,953 ("Vertical Aeroponic Plant Growing Enclosure with Support Structure").

Description of Related Art

Graves (Patent Literature 1) discloses a close-loop design of the production system for growing plants. All the plants (Graves Ref. No. 20) are planted on a tray (Graves Ref. No. 14) that floats on the surface of water. See, e.g., FIG. 1 of Graves. The fans in the tunnel push the plant trays to move forward. The work deck (Graves Ref. No. 38) is provided adjacent to a semi tubular portion of a large tubular structure (Graves Ref. No. 10).

However, because plants take weeks or months to grow and mature, the water filled tunnel of Graves is unrealistically long. Moving the plants during the growing period may not be preferred in view of the wasted energy required. That is, there may not be a point to move the plants during the growing period. Wainwright (Patent Literature 2) discloses a large growing apparatus with a rotating cylinder device that distributes liquid nutrition based on centrifugal force. All mechanical devices (motor, pump and belt) of Wainwright are located inside of the large growing apparatus (e.g., the motor is located in a watertight compartment of the large growing apparatus). See, e.g., FIG. 1 of Wainwright. The large growing apparatus of Wainwright may stay permanently wet. However, the liquid distribution due to the centrifugal force in Wainwright has a problem in that the liquid nutrition may not be evenly distributed because of multiple rows of the plants. That is, first plants close to the rotating cylinder device may get more coverage than second plants farther away from the rotating cylinder device. The second plants (farther away from the rotating cylinder device) may get less liquid nutrition or none at all. When the liquid exiting from the rotating cylinder device of Wainwright hits the ceiling, it drops to the bottom of the large growing apparatus. To keep a recirculation pump running, the liquid level needs to be monitored and maintained. This design has the same problem that plant roots are entangled with tubing and pumps.

Roy (Patent Literature 3) discloses a modular container designed for individual plant holding purpose(s). The container in Roy can be put together vertically. The vertically mounted nutrient conduits of Roy have individual tubing connected to the containers. The operator has to manually plant (i.e., individually put each plant into containers), as well as mount and stack the individual containers. Thus, it is time intensive and difficult to harvest, clean and replant using the containers of Roy, especially for mass production.

Pettibone (Patent Literature 4) discloses a continuous-loop conveyor design for plant production. At the beginning of the conveyor of Pettibone, the operator may seed or plant a young plant. The conveyor may move the plant or seed up a position to let the operator plant the next seed or next young plant. The conveyor of Pettibone extends vertically. According to Pettibone, the plant takes months to mature, and when the plant reaches half of the plant's growing period, the conveyor goes down in the back. Eventually, the plant matures and reaches back to the operator. The operator harvests it and plants the next one. In this regard, Pettibone is similar to Graves (Patent Literature 1). The flaw is that either the conveyor is miles-long or the operator works at an unrealistically slow pace to match the growth speed. Col. 4, line 37, of Pettibone indicates that one person can harvest one plant every day.

Harwood (Patent Literature 5) discloses a system and method for Aeroponic farming. An example process in Harwood starts at a planting seed stage, which is the least efficient way to germinate seeds due to waste of space and nutrients. A more efficient way is to plant seedlings, since not all seeds will germinate. The space will be wasted for those spots planted with non-germinating seeds. In addition, the plants and nutrient spray mounted at the bottom of the growth chamber in Harwood are open to the air. The catch basin is a big waste on surface area of the facility. The nutrient liquid mist can be anywhere inside of the facility due to the ventilation fan above the growth chamber. The facility humidity will be hard to control. The mist can be on the surface of any building structure, mechanical and electrical equipments and devices. This type of design delivers very low efficiency on nutrient delivery and creates problems in facility maintenance.

Due to its open-air design, it is impossible to have stackable growth chambers as the inventor claimed. The harvest can not be done automatically by machines, because the roots will be entangled with watering pipes, spray nozzles in the root chamber.

Hansen (Patent Literature 6) discloses a V-shape plant-holding device. In particular, roots of a plant(s) are held by perforations in the V-shaped basket of Hansen. The basket can be place on variety of shelves. Hansen explains coupling of the baskets. Each basket can hold up to three plants. One has to take apart of the asset to plant and harvest the plant.

Martin (Patent Literature 7) discloses a plant enclosure used in Aeroponic farming. The enclosure can be hung vertically. The pipe and nozzles are built inside of enclosure. After the plants are harvested, the enclosure can be very hard to clean because the pipes and nozzles are in the middle of roots. It can not reach high production efficiency.

Problem(s) to be Solved

The present disclosure addresses a problem in the related art of farming. In particular, the disclosure is related to aeroponic farming.

In this regard, the conventional technology did not have a planter design with a clean root chamber that is suitable for growing, harvesting, and cleaning. Also, the proposed growth processes are unrealistically long and waste energy.

SUMMARY

According to an embodiment of the disclosure, a planter may include: a housing configured to house one or more growth units, which are individual positions in the planter for growing an individual plant; one or more embedded liquid supply lines embedded in an upper portion of the housing; a drain line embedded in a lower portion of the housing; and a drain that is configured to remove liquid from the planter by a pump.

The one or more supply lines may be configured to supply liquid from a supply pump to an interior chamber of the planter. An upper surface of the housing of the planter may include, for each of the one or more growth units, a through hole that passes through the upper surface of the planter housing into the inner chamber of the planter.

Each of the at least one through holes may be positioned on a same horizontal plane.

The one or more growth units may include at least two growth units.

Each of the inner chambers corresponding to the at least two growth units may have same dimensions with regard to height, and width such that a head of a tool having the same dimension minus a threshold margin fits into each of the inner chambers corresponding to the at least two growth units, thereby making the planter compatible with an automated harvest and cleaning process.

The drain may include a plurality of drains including one drain for each of the at least two growth units, The at least one supply line may include two built-in tubes provided within one or more walls of the upper portion of the housing of the planter.

The at least two built-in tubes may include a first built-in tube located at a top right area of the growth unit, and a second built-in tube located at a top left area of the growth unit.

The planter may further comprise one or more built-in spray nozzles configured to deliver water or liquid nutrients, from the one or more liquid supply lines, to roots of the plant at an angle to the vertical direction.

The one or more built-in spray nozzles may include at least one built-in spray nozzle at each plant growth unit location.

A size of each of the one or more growth units in a planter may correspond to an anticipated size of roots of an individual plant.

The planter may further comprise a trench for collecting condensation drips from roots, wherein the trench may be located at the bottom of the lower portion of the housing of the planter, and the drain may be located in the trench.

The planter may further comprise a harvest tool, wherein the harvest tool may comprise a cutting blade, and the harvest tool may be configured to cut an upper portion each of the at least one plant, when the harvest tool moves in one direction.

The harvest tool may further comprise a plunger that has a head portion that is fitted to an interior cross section of the planter such that the plunger pushes out the root portion of each of the at least one plant, which were each cut by the cutting blade, in the one direction, when the plunger moves through the inside of the planter, as the harvest tool moves in the one direction.

The planter may further comprise a guiding wheel and a sliding rail. The harvest tool may be mounted on the guiding wheel, and the guiding wheel may be installed on the sliding rail, which may located along side of the planter, and which may run in the one direction.

The expanded planter may include at least two columns of growth units and at least two rows of growth units.

The supply line may be embedded in an upper ceiling of the planter.

A growth system according to an embodiment may comprise the planter, a first pump, which is a supply pump; and a second pump.

A growth system according to an embodiment may comprise the planter, a processor; and a motor. The processor may be configured to drive the motor so as to move the harvest tool so that the harvest tool automatically separates an upper portion of each of the at least one plant from a lower portion of each of the at least one plant.

The growth system may comprise at least one other planter that is configured to house at least one other one plant. The other planter may have the same dimensions and configuration as the (first) planter.

The growth system may further comprise: a processor, a motor and a conveyor belt, wherein the planter and the other planter are mounted on the conveyor belt. The processor may be configured to drive the motor to move the conveyor belt so that the planter moves from a first position to a second position. The first position may be a position of a working deck for planting, harvesting and cleaning. The second position may be a position other than the position of the working deck, which is one of an intermediary position or a growth area position.

The growth system may further comprise a plurality of light emitting diode (LED) lights that are configured to light the at least one plant while the planter is in the growth area position of the conveyor belt.

The growth system may further comprise a processor and a motor, wherein the processor is configured to drive the motor so as to automatically control the sequence of watering, fertilizing, lighting and when to move planters to the working deck, based on a the plant type.

BRIEF DESCRIPTION OF THE DRAWINGS

The disclosed subject matter, including features will be more apparent from the following detailed description and the accompanying drawings in which.

The embodiments of this disclosure are not limited by the drawings, and some elements may be omitted while still performing claimed functions.

DETAILED DESCRIPTION

According to certain embodiments, the disclosure provides a planter, growth system, and growth block method and apparatus for Aeroponic Farming. Aeroponic farming is familiar terms to ordinarily-skilled artisans in that technological field. The planter may have one or more growth units each corresponding to a position for at least one plant, as will be described in more detail below.

Figure 1:
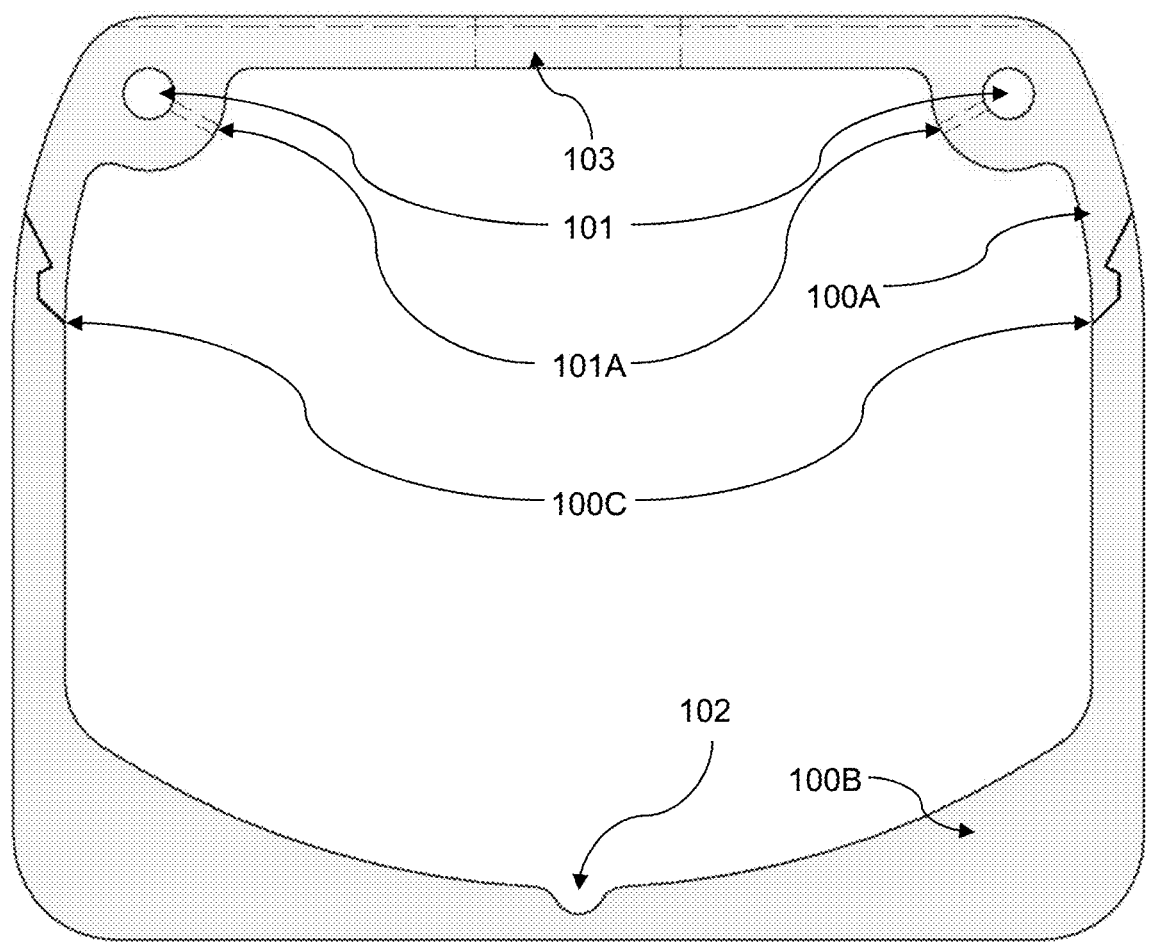
FIG. 1 shows a front sectional view of a planter according to an embodiment of the disclosure.

FIG. 1 shows a front sectional view of a planter 100 according to an embodiment of the disclosure. According to an embodiment, the planter 100 may comprise a housing (100A and 100B) configured to house one or more growth units. According to an embodiment, each of the one or more growth units may be individual positions in the planter for growing an individual plant (or a plurality of plants).

In an embodiment, the planter may include built-in tubes or lines, such as, a supply line 101 and a drain line connected to drain 102.

According to an embodiment, the planter 100 may include supply line(s) 101 and may include built-in spray nozzles 101A. The supply lines 101 may be configured to transport water and/or liquid nutrients. The supply lines 101 may include one or more embedded liquid supply lines embedded within an upper portion 100A of the housing (the housing comprising 100A and 100B). According to an embodiment, at each plant location in the planter 100 (i.e., each growth unit within the planter 100), predrilled spray nozzles 101A may be provided that are connected to the built-in tubes (supply lines 101). According to an embodiment, the spray nozzles 101A may be angled so as to deliver the liquid (water or liquid nutrients) to roots of the plant. However, other portions of the plant may be targeted. An orifice size of the nozzle(s) 101A may be selected in advance based on an anticipated droplet size and flow rate suitable for an anticipated type of plant.

The supply line(s) 101 may deliver one or more of: water or liquid nutrients. The supply lines 101 may be located in the top corners of the planter 100. For example, the supply line(s) 101 may include at least two supply lines 101, each of which may run at an upper corner of the two upper corners of the planter 100 (in an embodiment where a shape of the upper housing portion 100A is square or cube shaped as shown in FIG. 1). However, the supply lines are not limited to this configuration and may be embedded in other locations of the housing.

Although two liquid supply lines 101 are shown in FIG. 1, more than two may be used, or, alternatively, one liquid supply line 101 may be used. The one or more supply lines 101 may be are configured to supply liquid from a supply pump to an interior chamber of the planter.

As shown in FIG. 1, according to an embodiment, the planter 100 may include an upper portion 100A which may act as a removable top, according to an embodiment.

According to an embodiment, a break line 101C for the removable top (upper portion 100A) may be configured to disengage from the lower portion 100B (e.g., a main body 100B) of the planter 100. In this regard, the removable top 100A (upper housing portion 100A) may be configured to be attached, detached, and re-attached to the main body 100B (lower housing portion 100B). The planter 100 may also include a drain 102 with a corresponding drain line for removing excess liquid from the planter 100.

According to an embodiment, a drain 102 may be embedded in the lower portion 100B of the planter 100, according to an embodiment (as shown in FIG. 1). The drain line may be configured to remove liquid from the planter by a pump.

As shown in FIG. 1, a drain 102 may be provided in the lower housing portion 100B of the planter 100. The drain 102 may be located in a trench at the bottom of lower housing portion 100B and may collect water and liquid nutrients condensation that drips from plant roots. The trench may extend through multiple growth units.

Shape

According to a preferred embodiment, the housing of each planter 100 may box shaped, such as, in the shape of a cube or rectangular box in the drawings. As shown in FIG. 1, the planter 100 may be substantially box shaped on outer surfaces of the upper and lower housing portions 100A and 100B, while having a specific profile defined by inner surfaces of the upper and lower housing portions 100A and 100B. In particular, as discussed in more detail below, the inner surfaces of the upper and lower housing portions may provide a profile that corresponds to a profile of a cutting (harvesting) tool. However, other shapes may be used, and the planter is not limited to any specific shape (e.g., box shape) in each housing portion.

Each individual growth unit within the planter 100 may have an opening 103 on the top of the upper housing portion 100A for a plant held within the growth unit to grow shoots. The housing 100A and 100B may be constructed using a high strength material, such as, any high strength engineering plastic. However, the use of metal for the housing 100A and 100B is preferably avoided to prevent the housing 100A and 100B from experiencing any type of oxidation (rust) reaction, due to the high moisture content inside of the housing 100A and 100B. According to an embodiment, the planter 100 may be configured such that each of the at least two holes 103 (which may be through holes) are positioned on a same horizontal plane.

Figure 2:
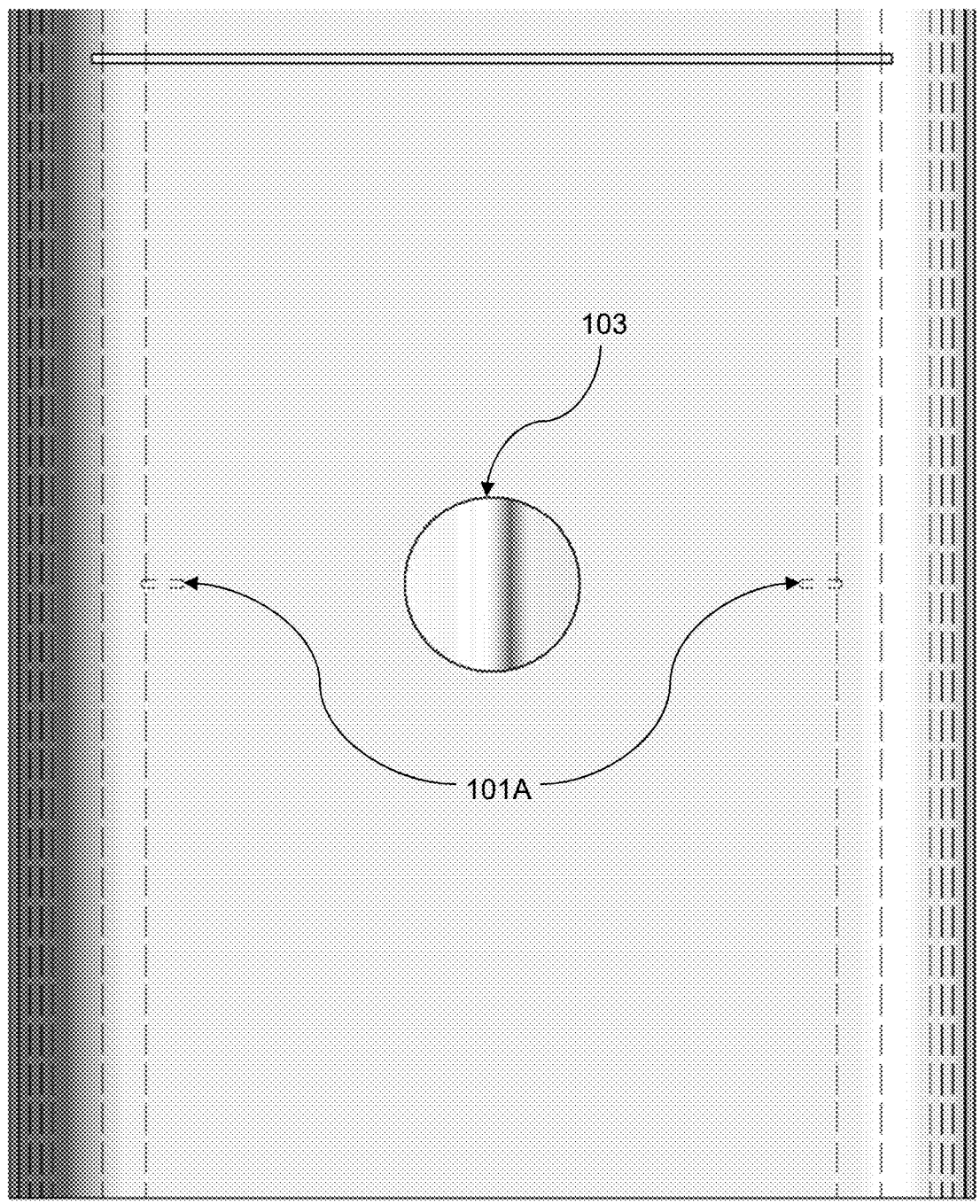
FIG. 2 shows a top view of an upper housing portion of a planter according to an embodiment of the disclosure.

The size of the planter may be determined in advance. In particular, the size of the housing portions 100A and 100B may be determined in advance based on an anticipated size of a plant root(s) of an anticipated plant to farm, and based on a number of individual growth units to be provided by the planter. For example, if a plant to be farmed requires a one foot by one foot space to grow properly, the housing portions 100A and 100B may be designed to accommodate 10 plants by having dimensions of 1 foot (height)×1 foot (width)×10 feet (length), or 1 foot (height)×10 feet (width)×1 foot (length). Of course, other configurations may be used and the above numerical examples are merely exemplary. FIG. 2 shows a top view of the planter 100 of FIG. 1, and, in particular, shows a top view of upper housing portion 100A, which may be removable. In FIG. 2, lower housing portion 100B is hidden from sight by upper housing portion 100A. In this regard, the upper housing portion 100A may have a same surface area of a top outer surface as a surface area of a bottom outer surface of the lower housing portion 100B. FIG. 2 shows the embedded spray nozzles 101A using dashed lines indicating that the spray nozzles 101A would be hidden from view.

Figure 3:
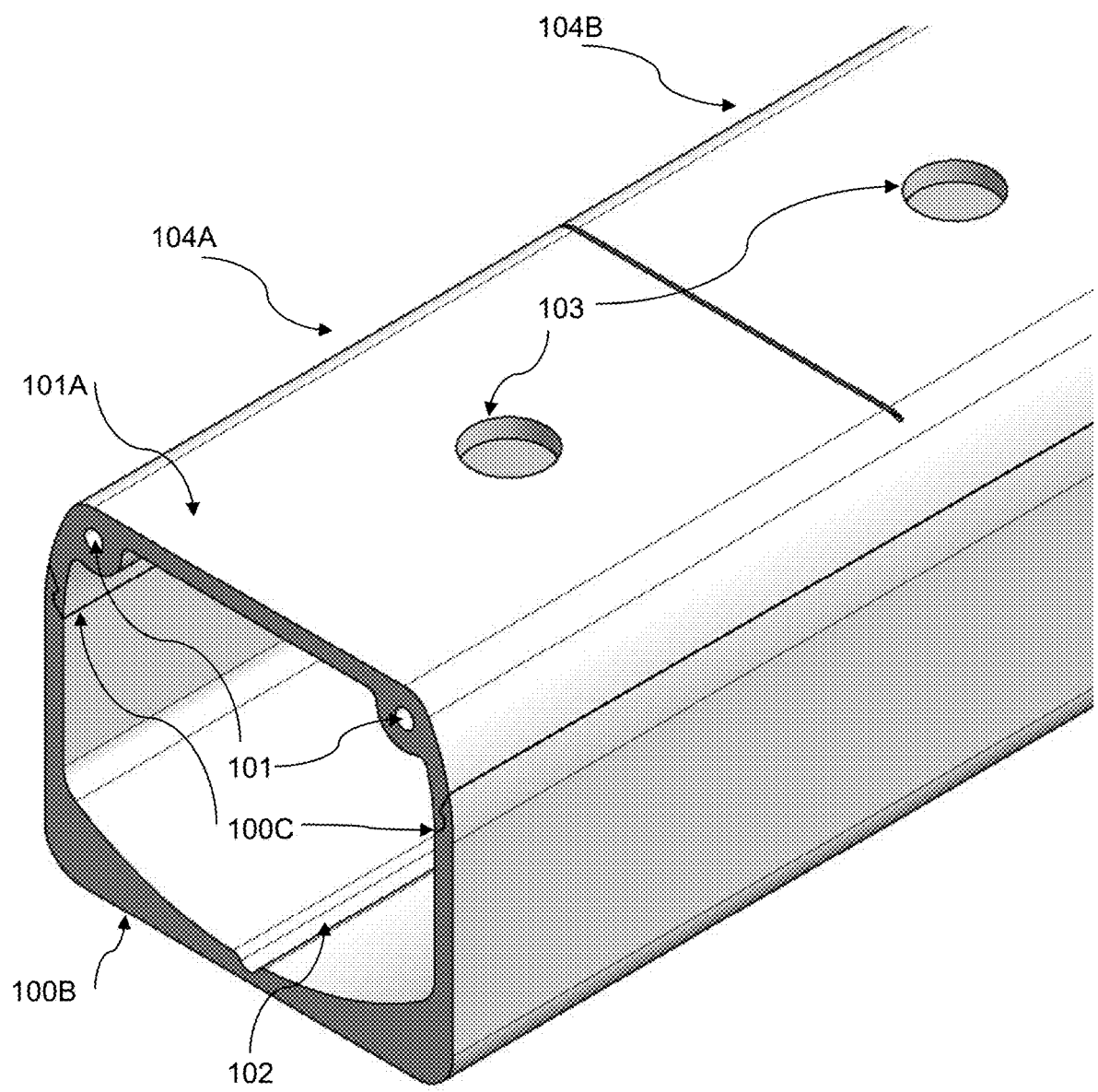
FIG. 3 shows a perspective view of a planter according to an embodiment of the disclosure.

FIG. 3 shows a perspective view of a planter 100 according to an embodiment of the disclosure. As shown in FIG. 3, the planter 100 may have at least two growth units (104A and 104B) with each of the at least two growth units 104A and 104B having a respective individual opening 103 for the plant to extend through.

Figure 4A:
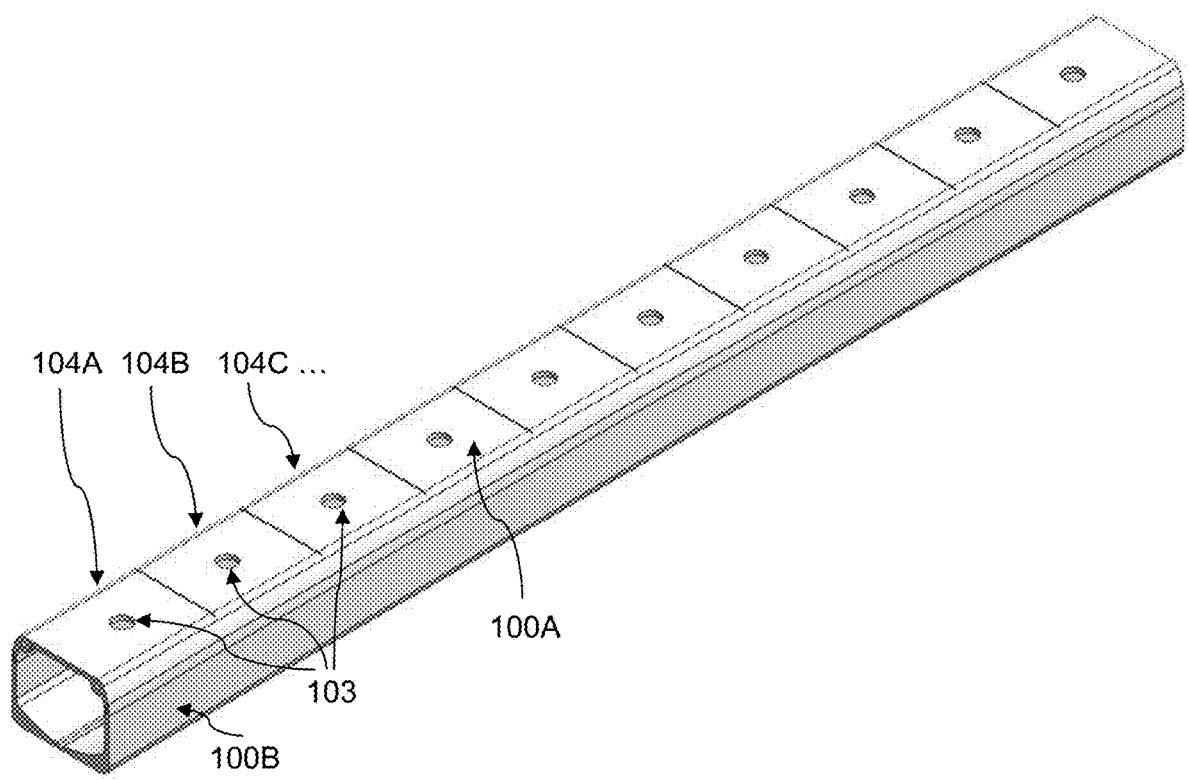
FIG. 4A shows a planter, according to an embodiment, with multiple growth unit positions.
Figure 4B:
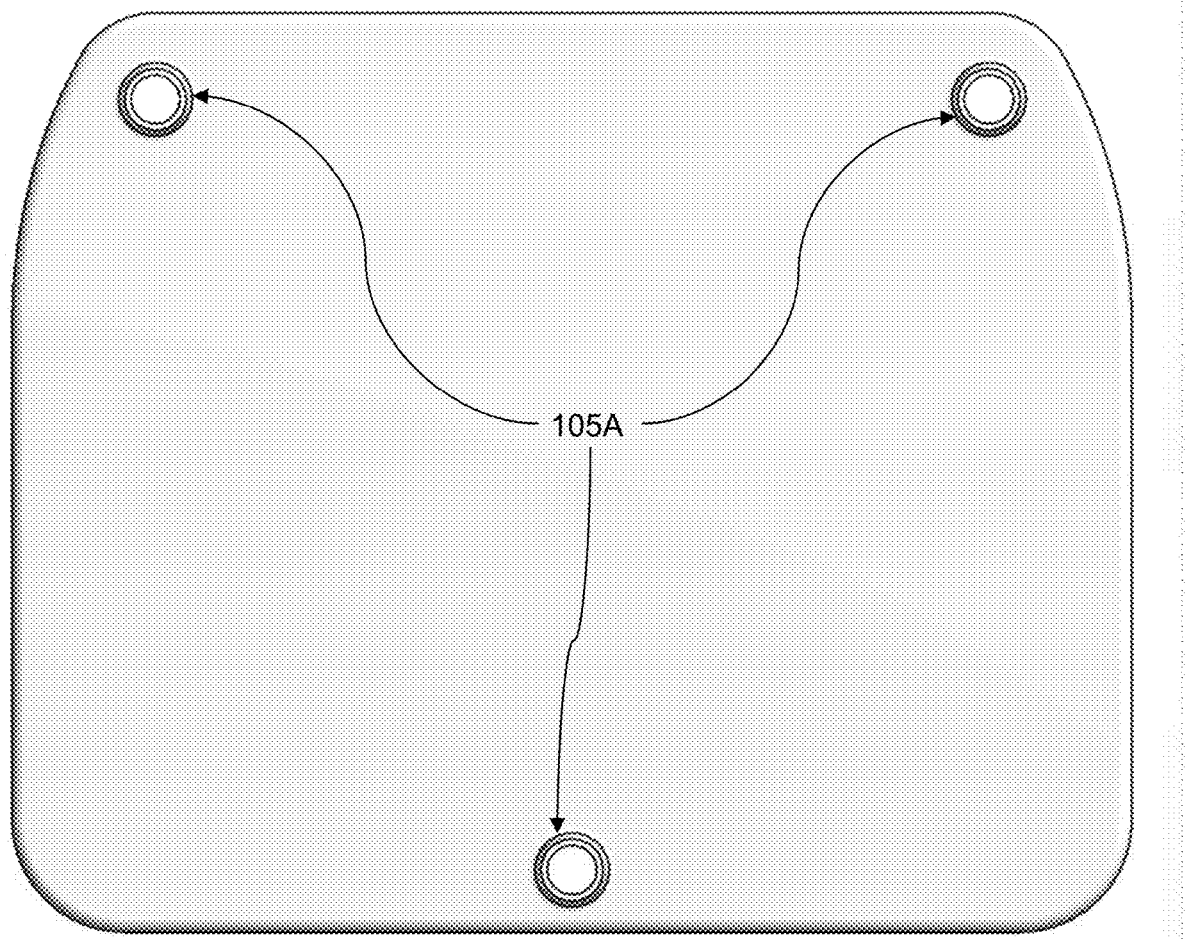
FIG. 4B shows a front view of an end cover 105 of the planter according to an embodiment of the disclosure.

FIG. 4A shows a planter 100, according to an embodiment, with multiple growth unit positions 104A, 104B, 104C, etc. As an example, FIG. 4 shows a 10-position growth unit 200 (the first three growth unit positions are labeled as 104A, 104B and 104C). The liquid supply lines 101 and the drain lines may run through each of the growth units 104A, 104B, 104C, etc. in the planer 100. The break line 100C may extend for each of the growth units 104A, 104B, 104C, etc. According to an embodiment, each of the growth units (104A, 104B, 104C, etc.) may have their own drain 102 (which share a common drain line) and each of the growth units may have its own opening 103. FIG. 4B shows a front view of an end cover 105 of the planter 100 according to an embodiment of the disclosure. In addition, FIG. 4B shows barb connectors 105A for connecting the respective supply line(s) 101 and drain line (connected to drain 102), respectively, to an outside source (e.g., a pump that is not a part of the planer housing).

Figure 4C:
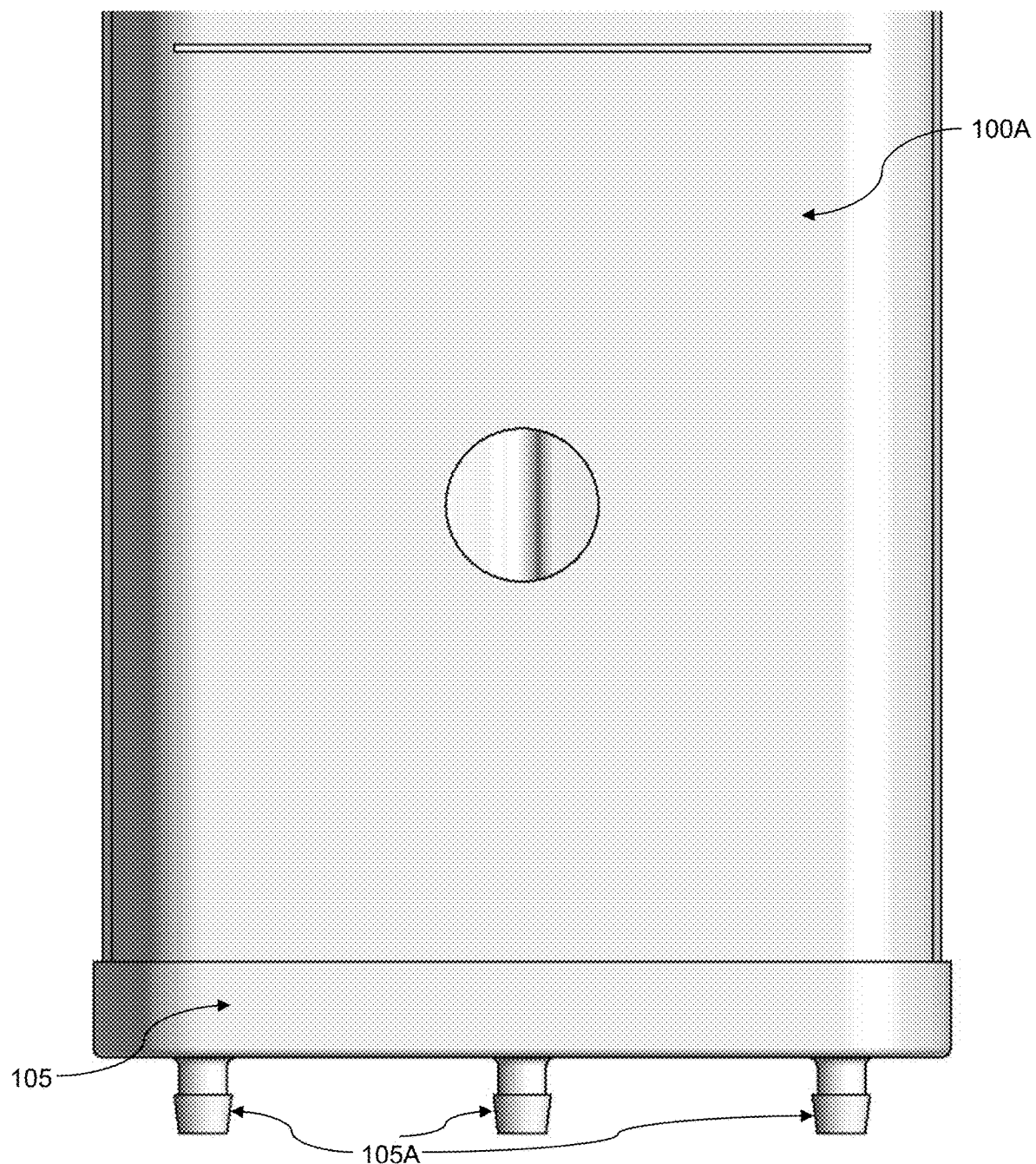
FIGS. 4C-4E show top, side and perspective views, respectively, of the planter with end cover according to an embodiment.
Figure 4D:
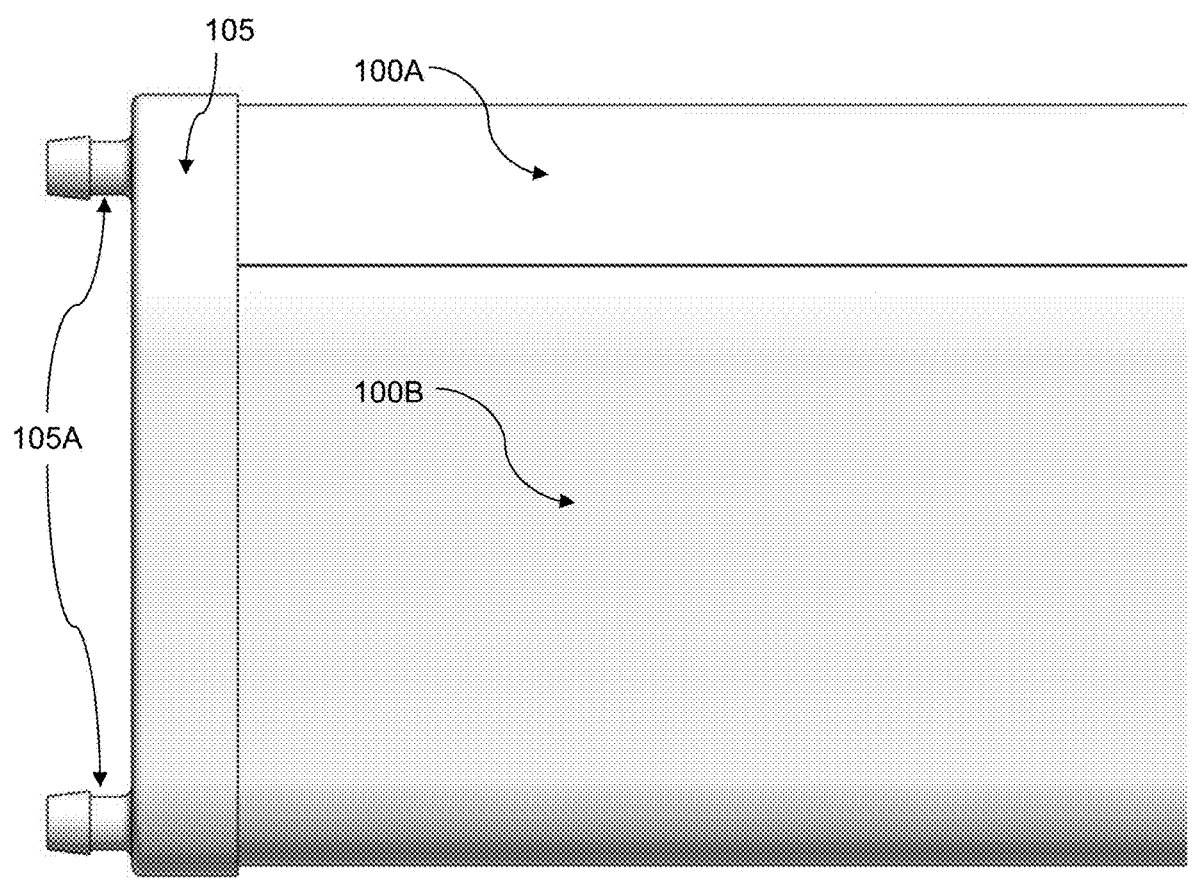
Figure 4E:
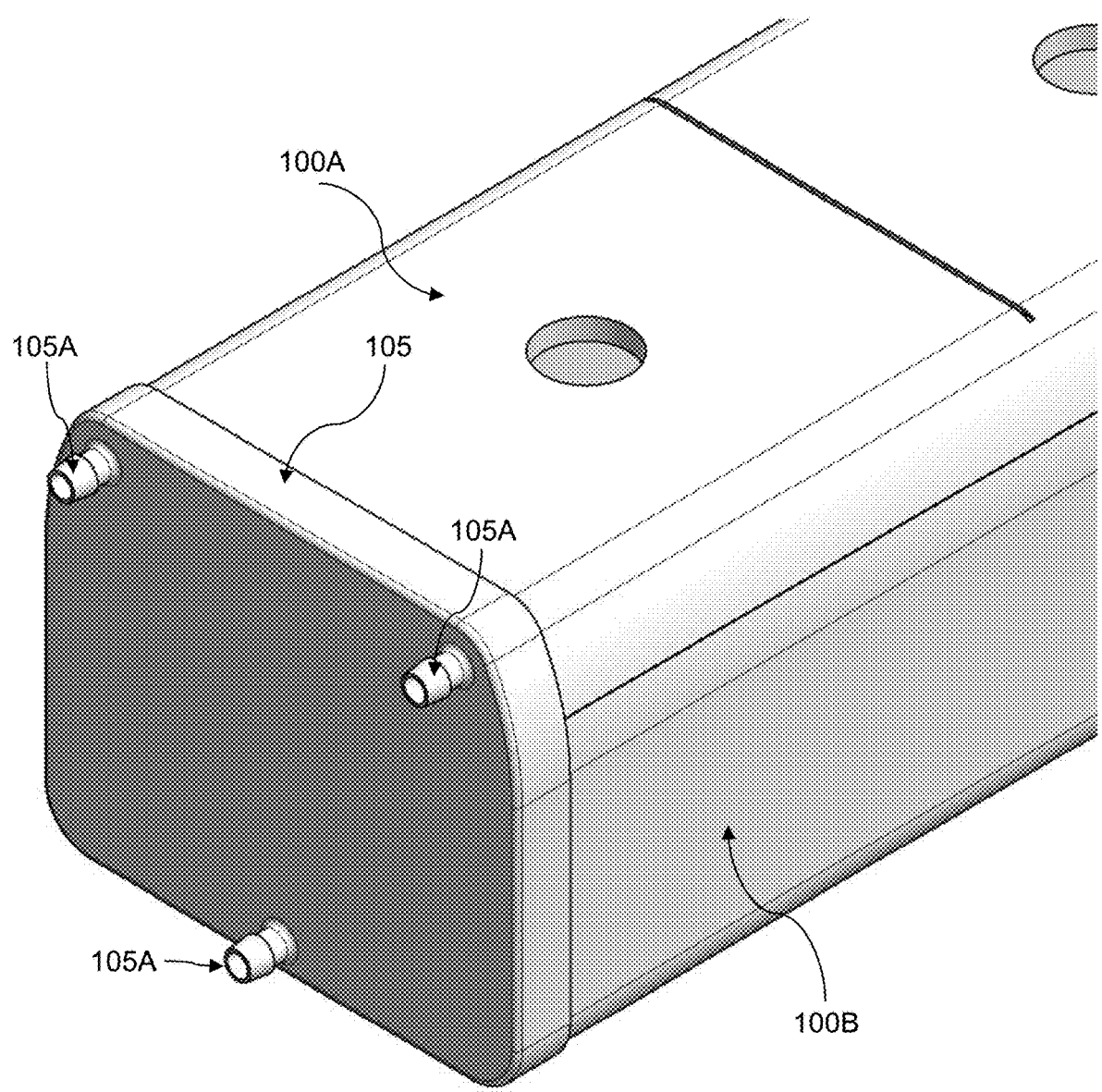

FIGS. 4C-4E show top, side and perspective views, respectively, of the multiple position planter 100 of FIG. 4A with end cover 105.

Harvest Tool

When the at least one plant is/are mature and ready to be harvested, the planter 100 may be drained and the end cover(s) 105 may be removed. A harvest tool 200 (shown in FIGS. 5A-5D according to an embodiment) may be used to cut a portion of the plant(s), such as, a shoot of each plant(s). The harvest tool 200 may comprise a cutter 201 and a plunger 202. The harvest tool 200 may be configured so that the entire cutter 201 (or at least a portion of the cutter 201) is positioned above the upper housing portion 100A of the planter 100, when, for example, the plunger 202 plunges inside of the planter 100 (i.e., inside an inner chamber created by inner surfaces of housing portions 100A and 100B. The harvest tool 200 may be driven so that the cutter 200A cuts plant shoots above the upper housing portion 100A and the plunger 202B pushes out remaining plant pieces (e.g., plant roots) from inside of the planter. This process may happen simultaneously.

FIGS. 5A-5D show front, top, side and perspective views, respectively, of a harvest tool (harvester) according to an embodiment of the disclosure.

According to an embodiment, a size of the cutter can be customized in advance to fit a shoot size of the plant. According to an embodiment, the plunger may be designed to be fitted to an interior cross section of the planter 100. Fitted to the interior cross section means that the plunger 202 may have a horizontal profile in one direction that fits and is moveable through the interior of the planter 100.

Figure 5A:
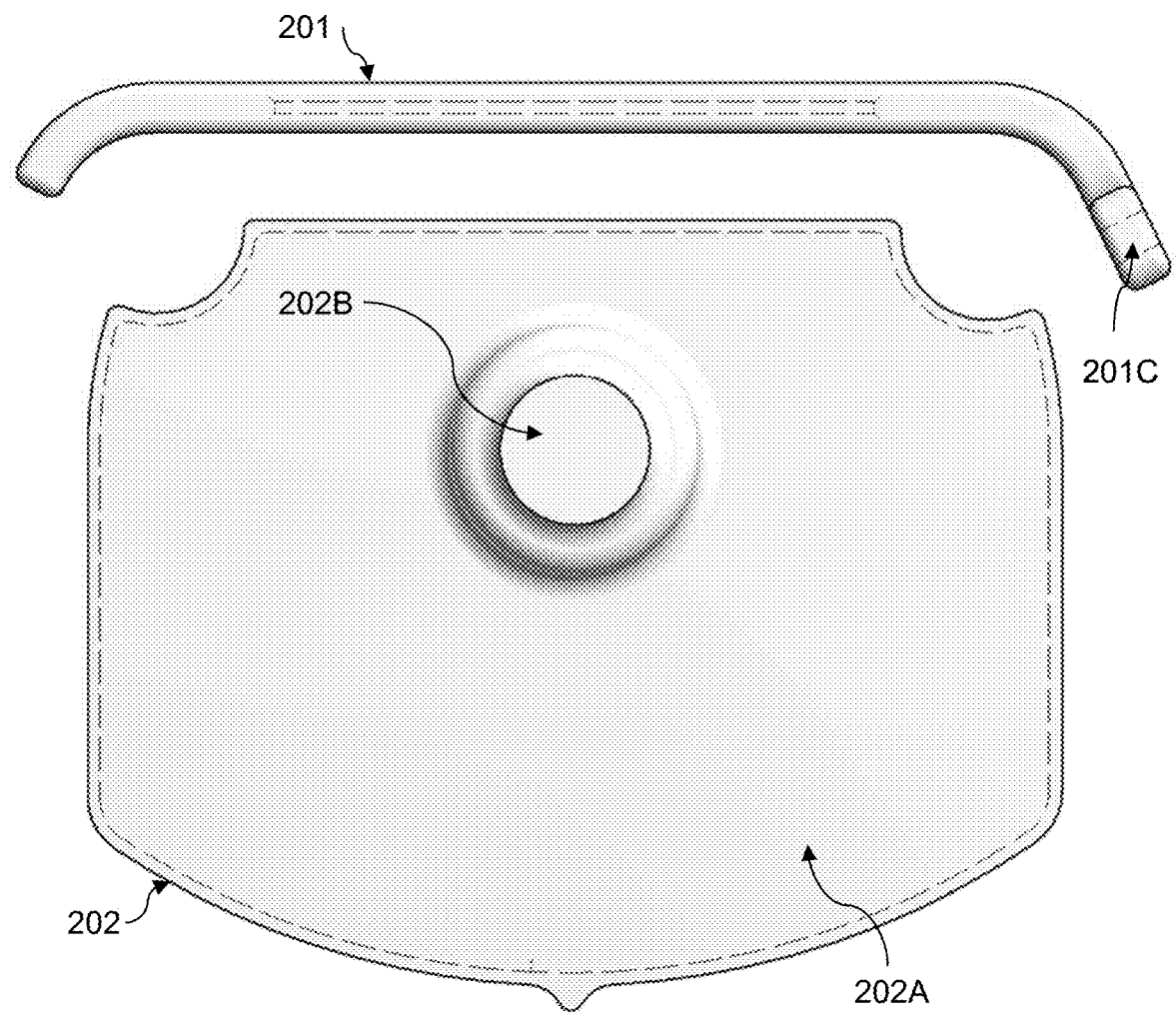
FIGS. 5A-5D show front, top, side and perspective views, respectively, of a harvest tool (harvester) according to an embodiment of the disclosure.
Figure 5B:
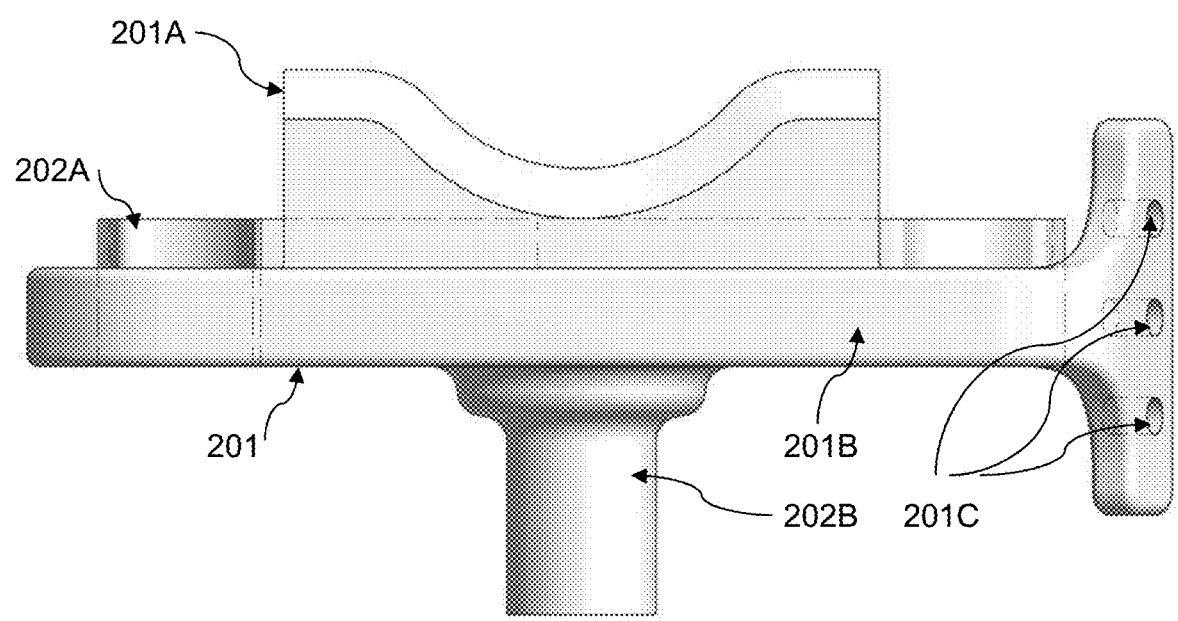

In this regards, the inner chamber of the planter 100 may have at least two growth units having same dimensions with regard to height, and width such that a head 202A of a tool (e.g., a plunger) having the same dimension minus a threshold margin fits into each of the at least two growth units of the planter 100, thereby making the planter compatible with an automated harvest and cleaning process. In FIGS. 5A and 5B, the plunger 202 is shown with a head 202A and a shaft 202B.

FIG. 5B shows a top view of the cutter 201 with a cutting blade 201A and a body portion 201B of the cutter 201, and the plunger 202B. In FIG. 5B, the head portion 202A is partially hidden from sight because of the body portion 201B of the cutter 201 that is above it.

Figure 5C:
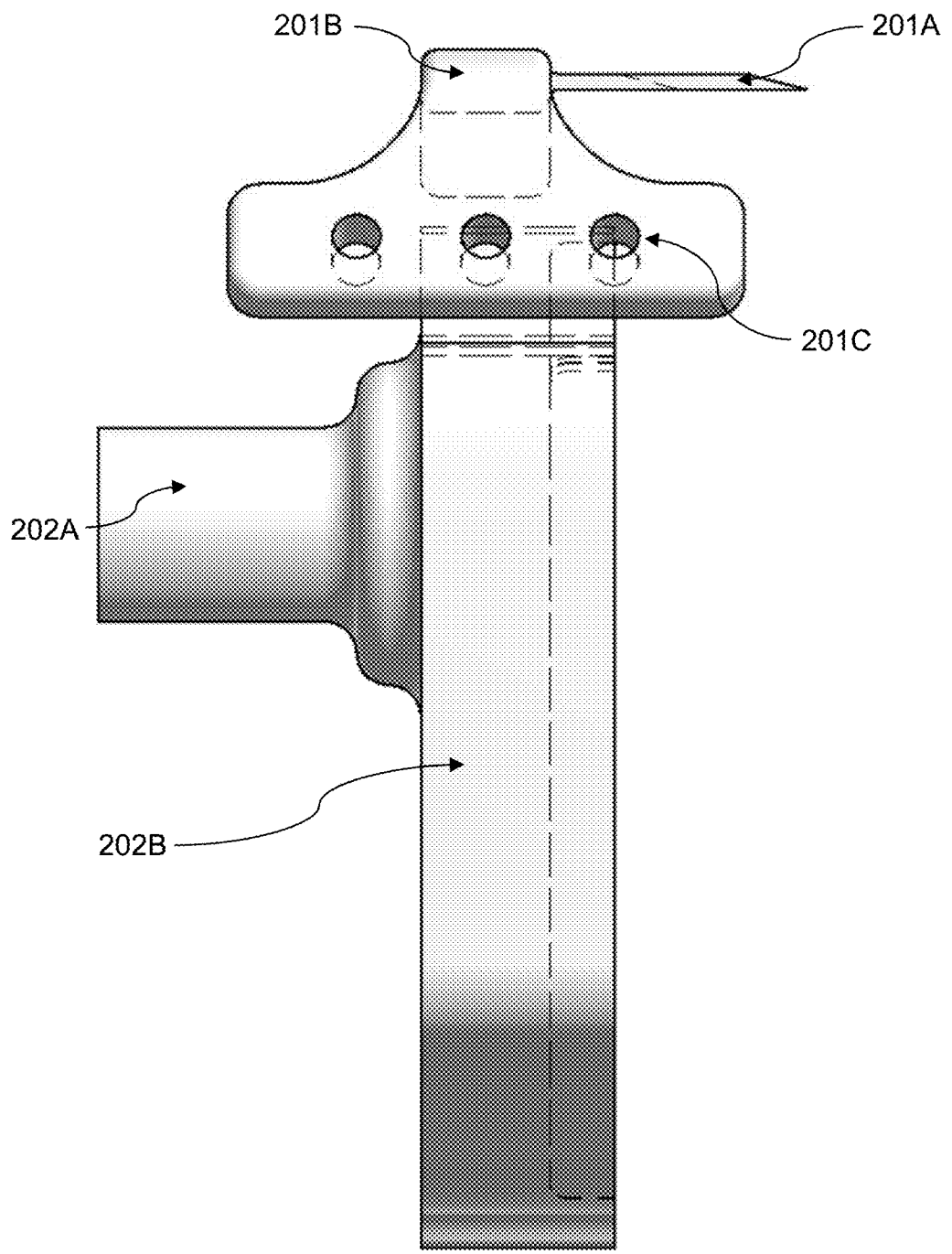
Figure 5D:
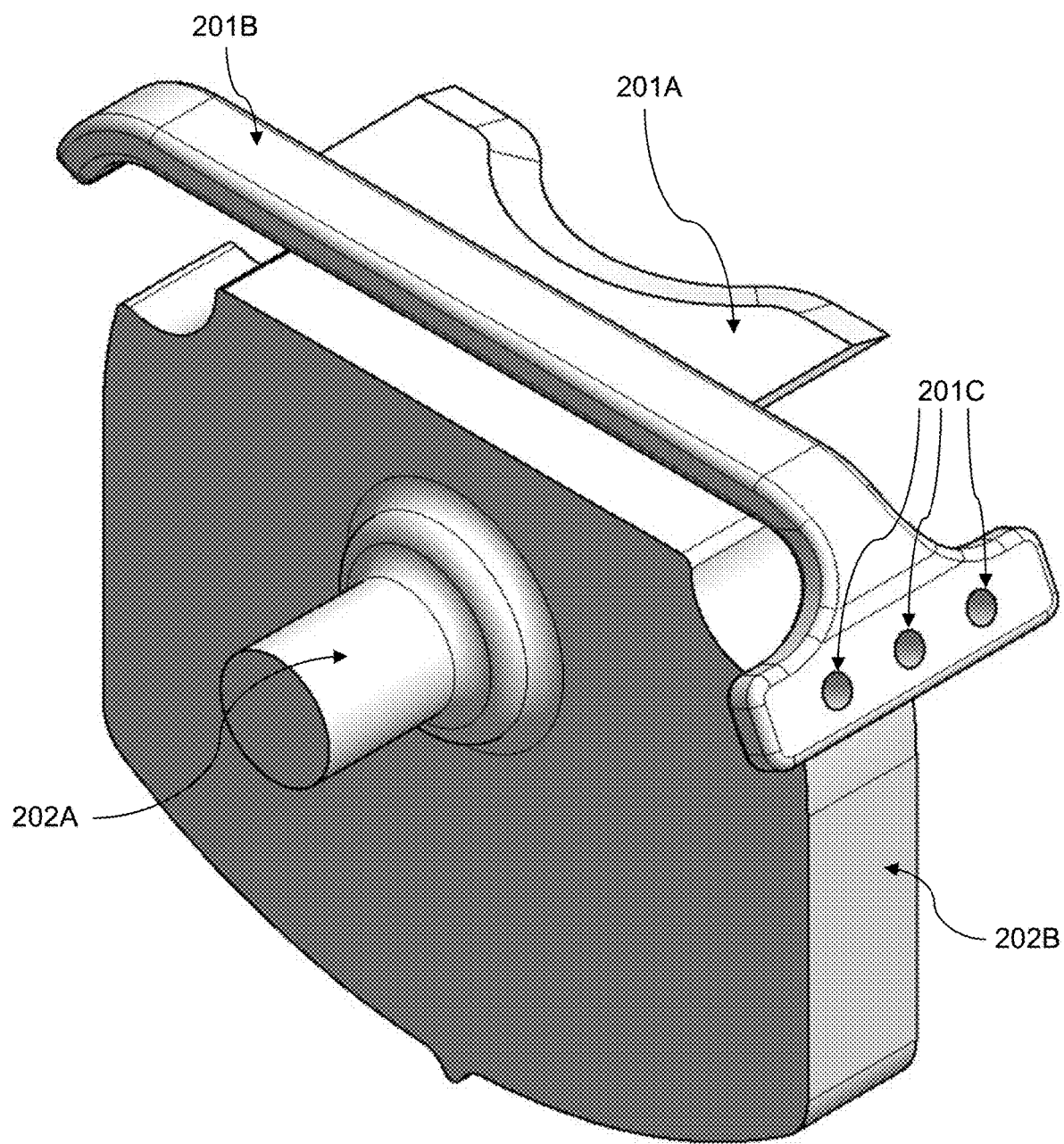
Figure 6A:
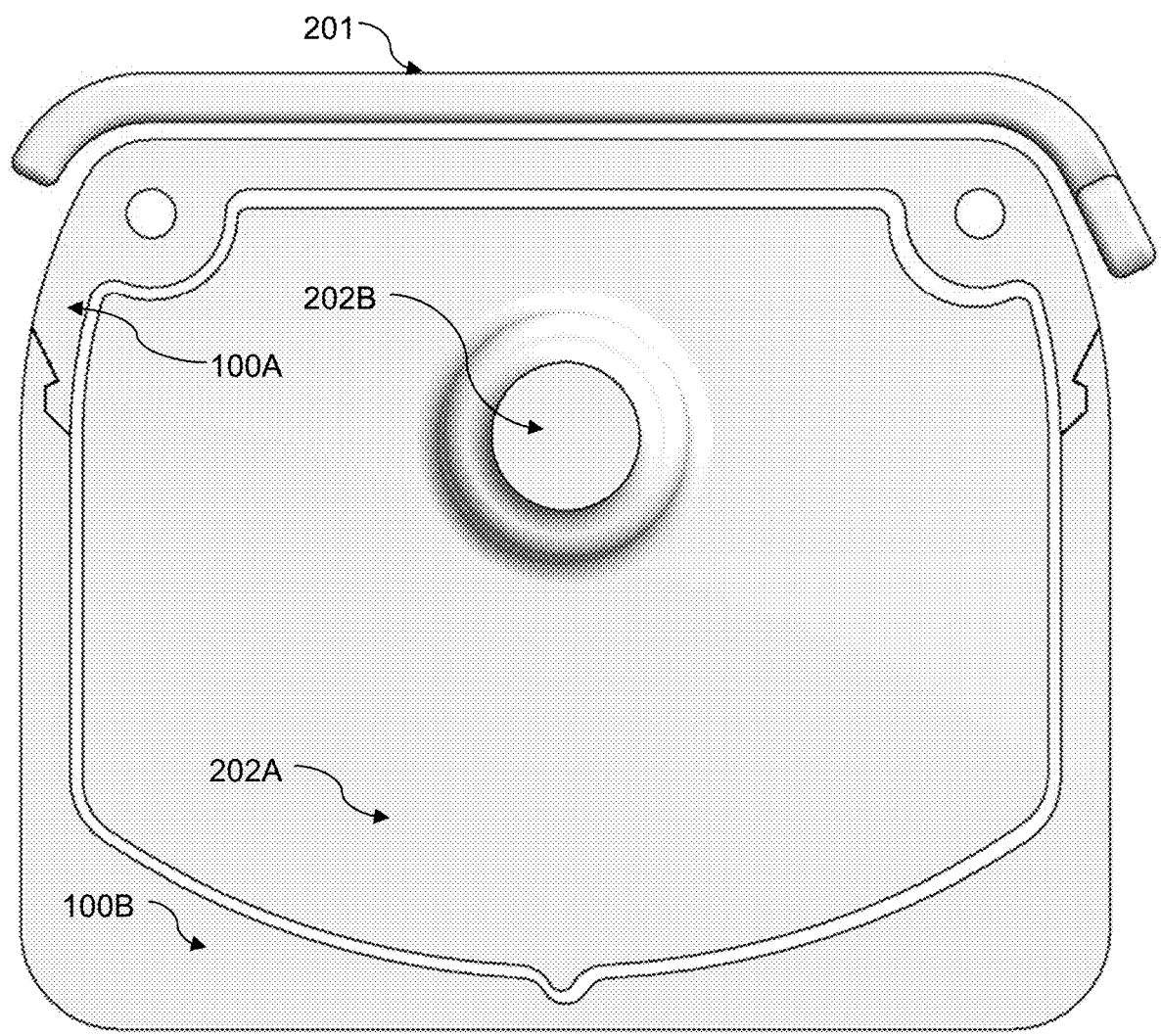
FIGS. 6A-7D show front, top, side and perspective views, respectively, of a planter, and a harvest tool including a cutter 201 and a plunger 202, according to various embodiments.
Figure 6B:
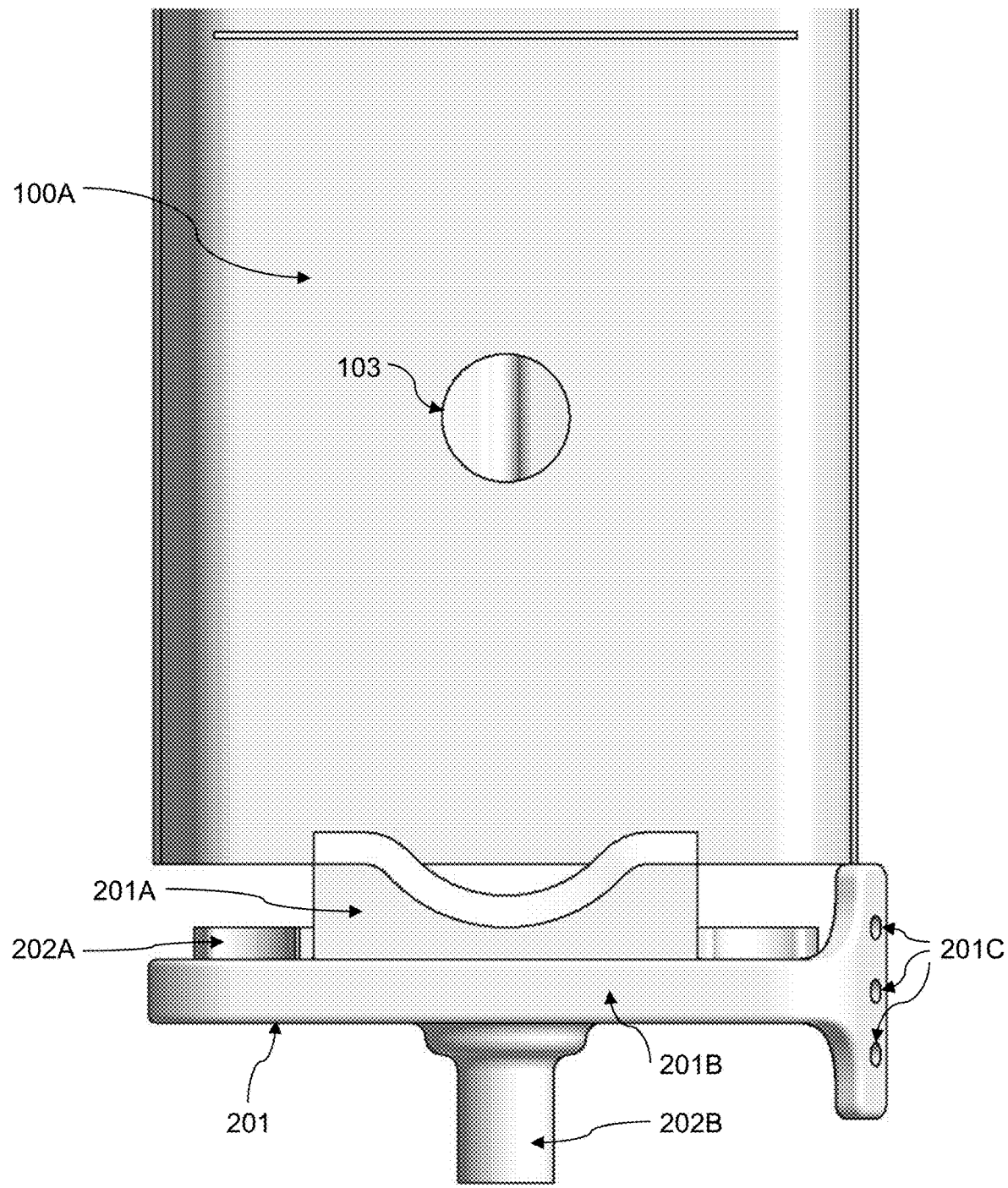
Figure 6C:
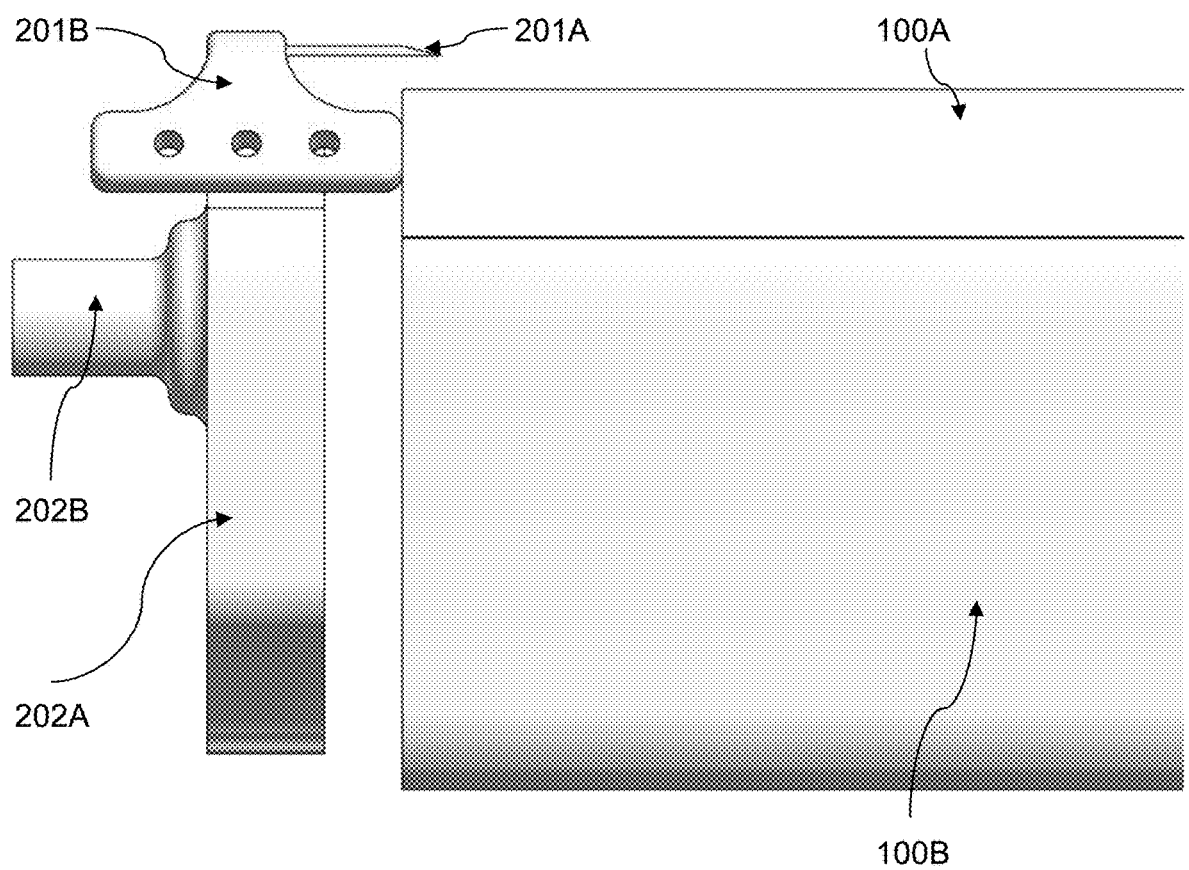
Figure 6D:
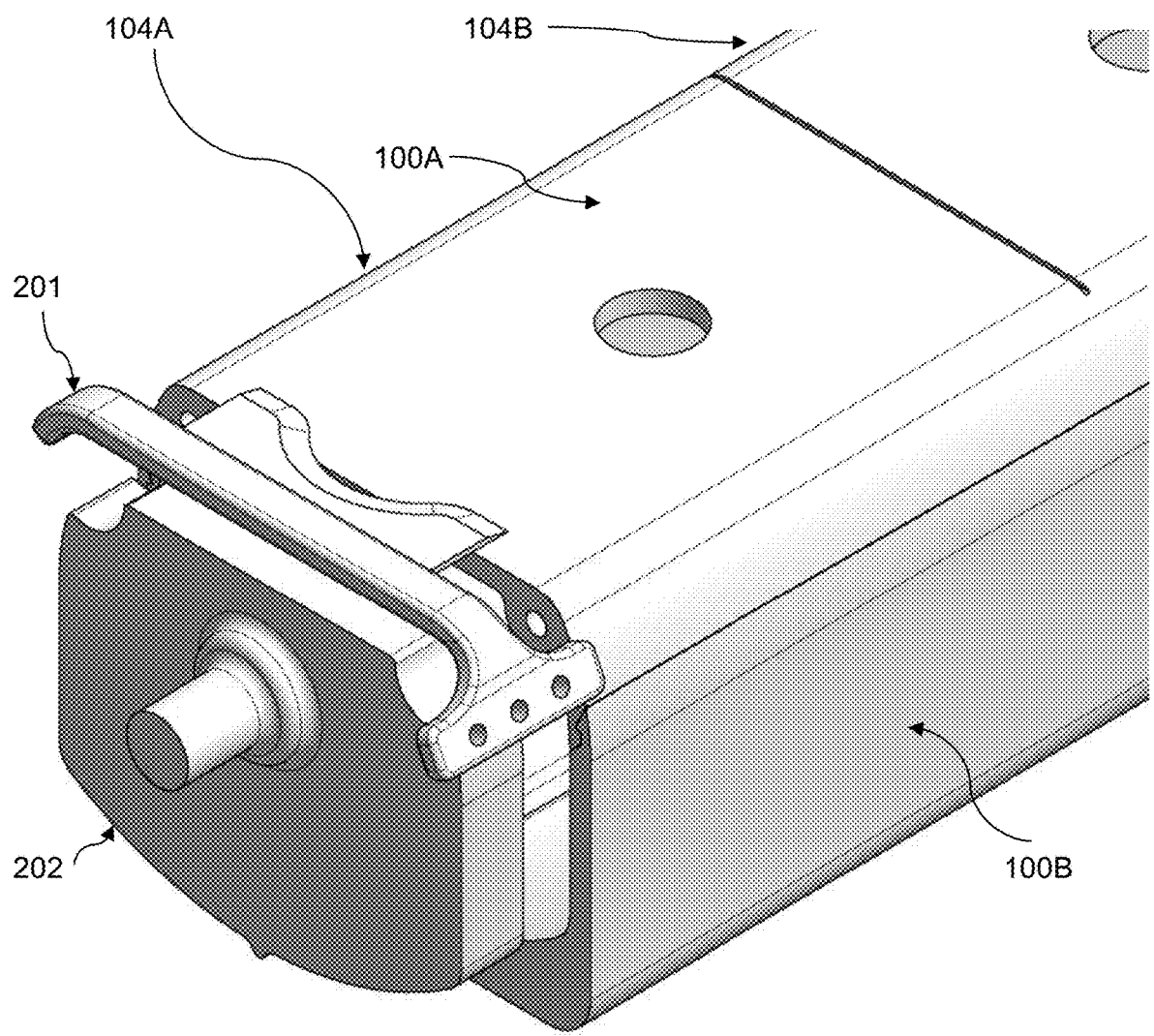
Figure 7A:
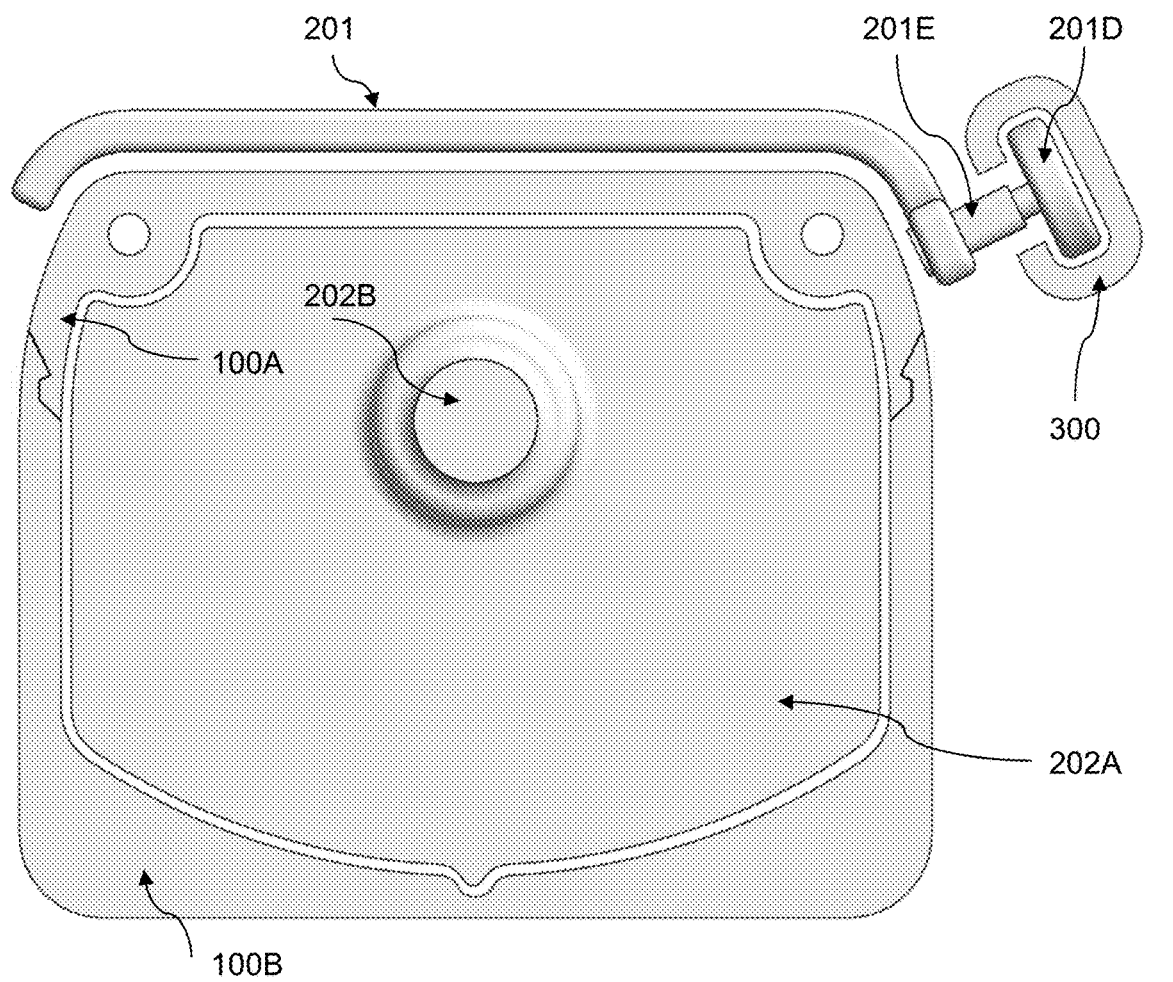
Figure 7B:
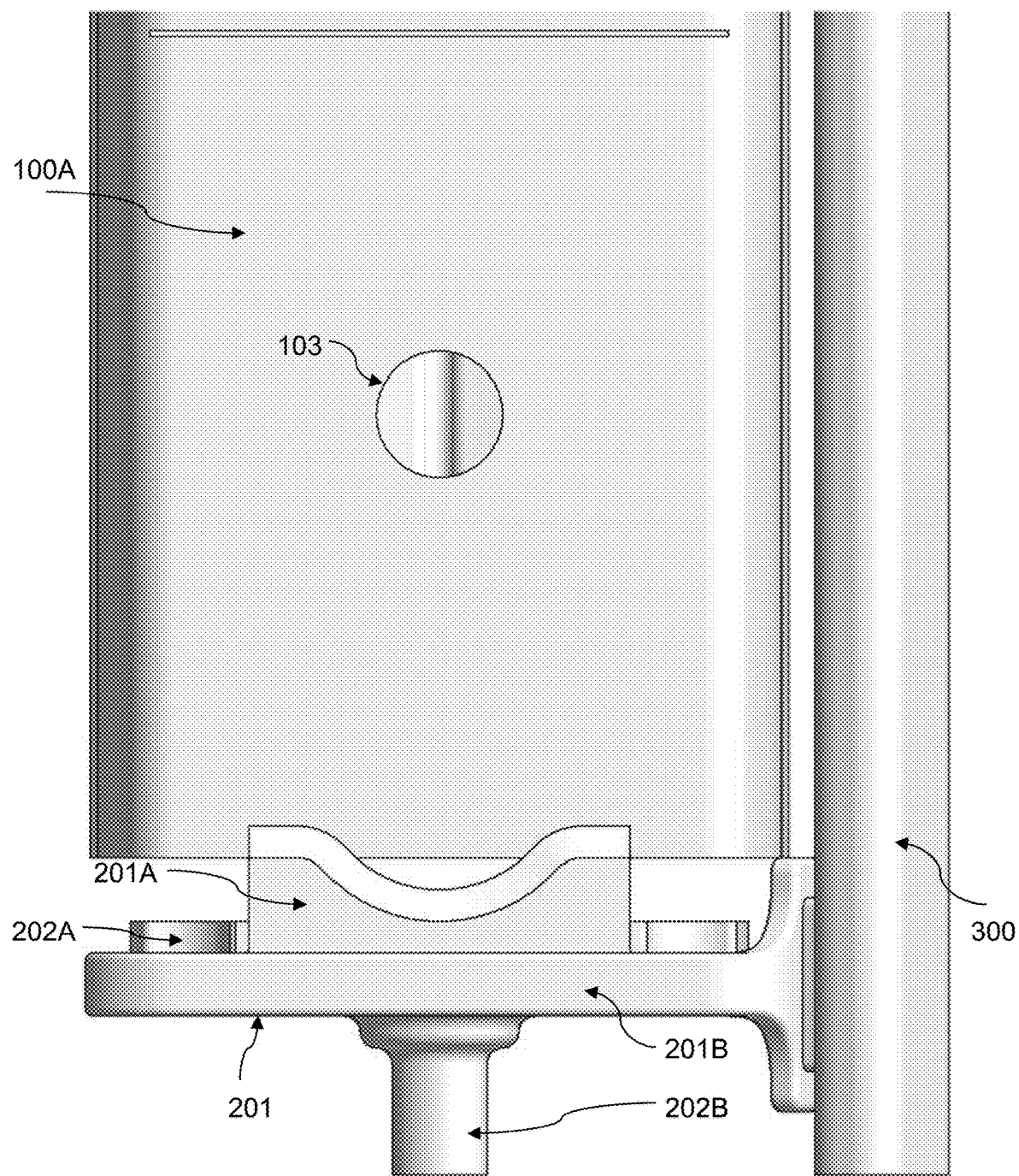
Figure 7C:
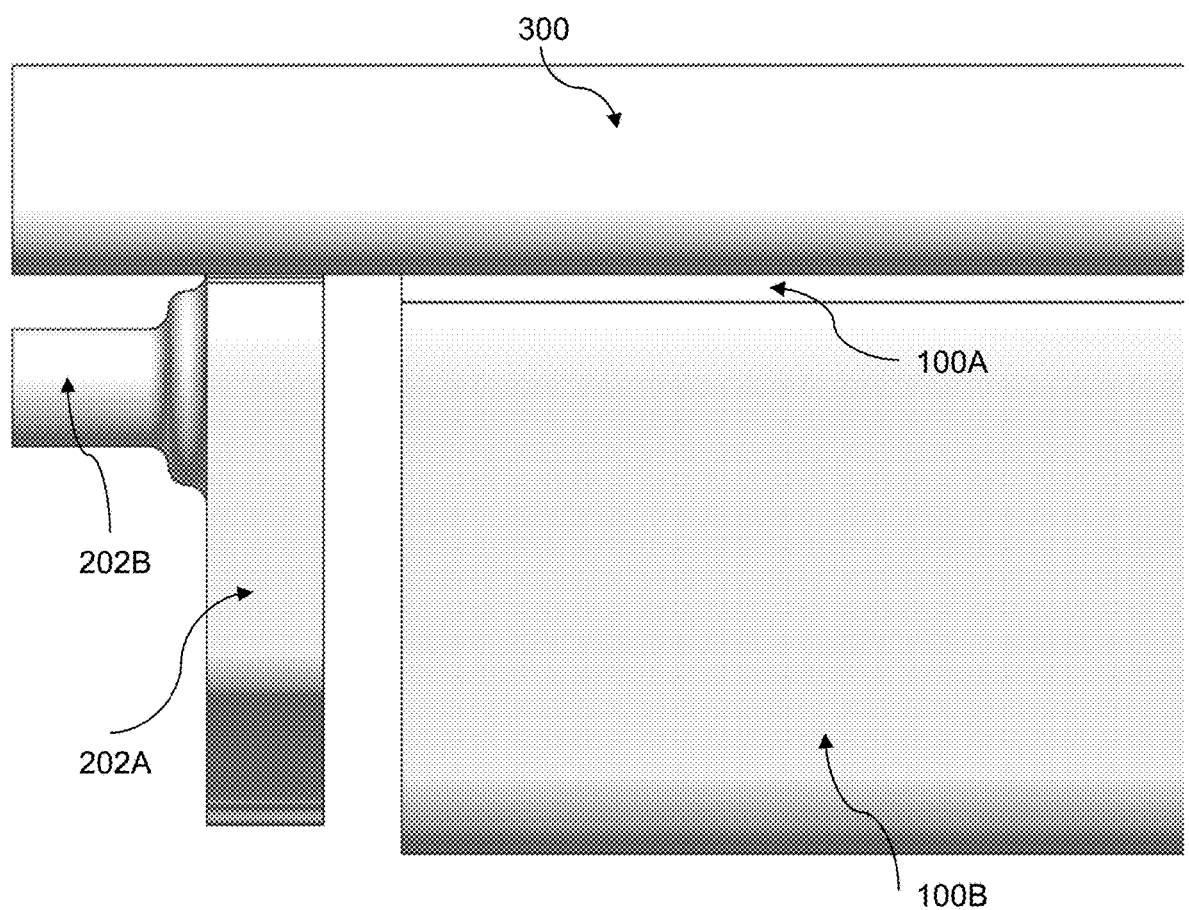
Figure 7D:
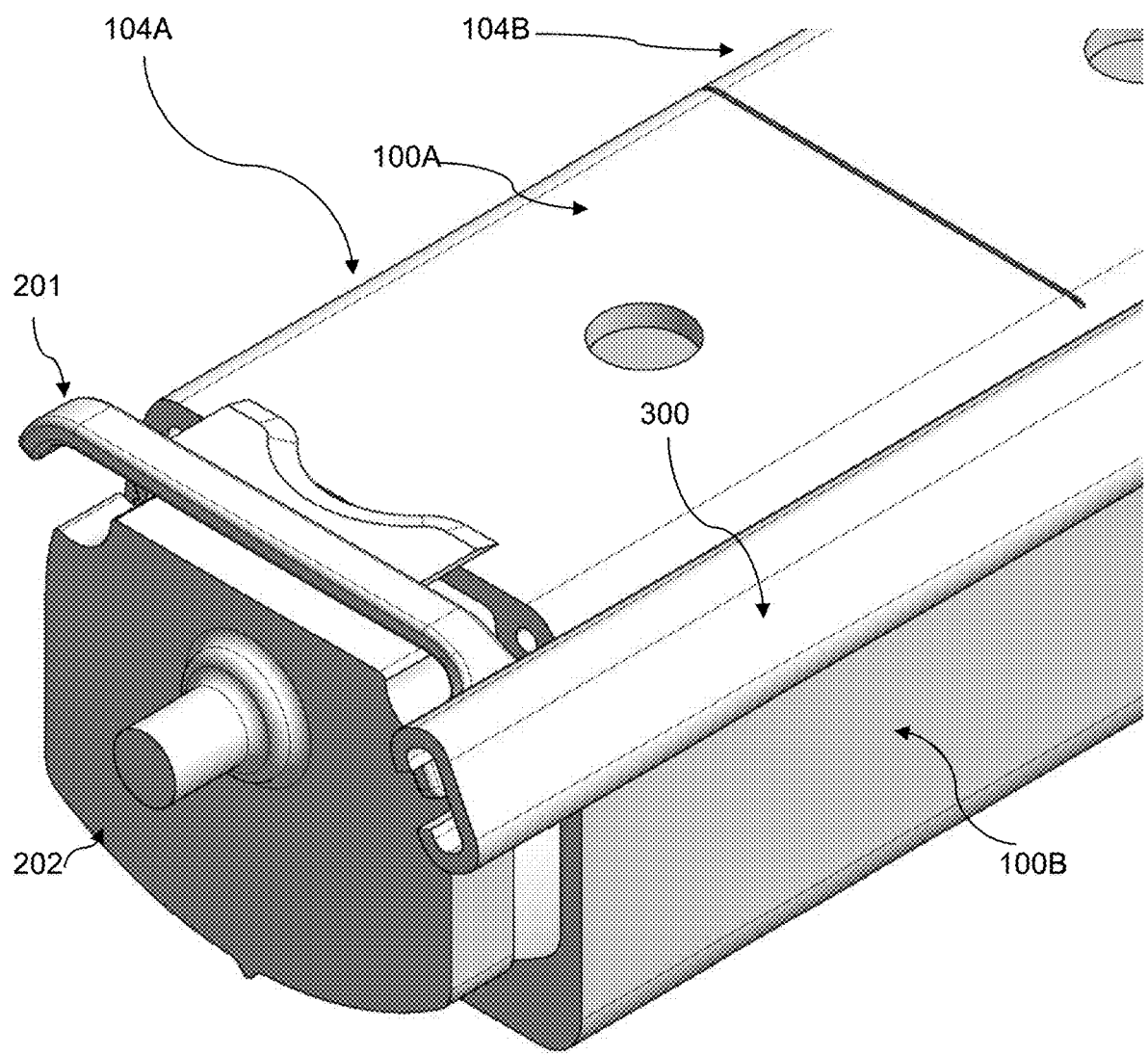

FIG. 5C shows a side view of the cutter 201 and plunger 202. In addition, FIG. 5C shows mounting holes 201C. The mounting holes will be described in more detail below with regard to the automatic harvest and clean process.

FIGS. 6A-6D show front, top, side and perspective views, respectively, of a planter 100, and a harvest tool 200 including a cutter 201 and plunger 202.

FIG. 7A-7D show front, top, side and perspective views, respectively, of a planter 100, and a harvest tool 200 including a cutter 201 and a plunger 202. FIGS. 7A-7D also show an embodiment with the cutter 201 installed on (or mounted on) a sliding rail 300. According to an embodiment, the harvest tool 200 may be mounted on a guiding wheel 201D and installed on a sliding rail 300 adjacent to the planter. The cutter 201 may engage with the sliding rail 300. For example, the cutter 201 may engage with the sliding rail 300 by means of a sliding wheel 201D connected to the cutter. The sliding wheel 201D may roll within the sliding rail 300 so that the cutting blade 201A is moved along a horizontal plane (without much if any variation in the horizontal plane). A mounting bolt 201E may be provided for connecting the mounting wheel 201D to the main body portion 201B of the cutter 201 at mounting hole 201C. The movement of the harvester may be driven by a motor controlled by a control device that includes a hardware processor. The control of the control device is described in more detail below. The sliding rail 300 may be a C-channel rail according to an embodiment. However, other rails may be used. According to an embodiment, the harvest tool may only be available at a working deck position of the growth block. When the harvest tool is applied to the planter, both a cutter 201 and a plunger 202 may move from one end of the planter to another end of the planter that is different from the one end of the planter. The motors may drive both cutter 201 and plunger 202 and may be controlled by the control system or the operator.

Figure 8:
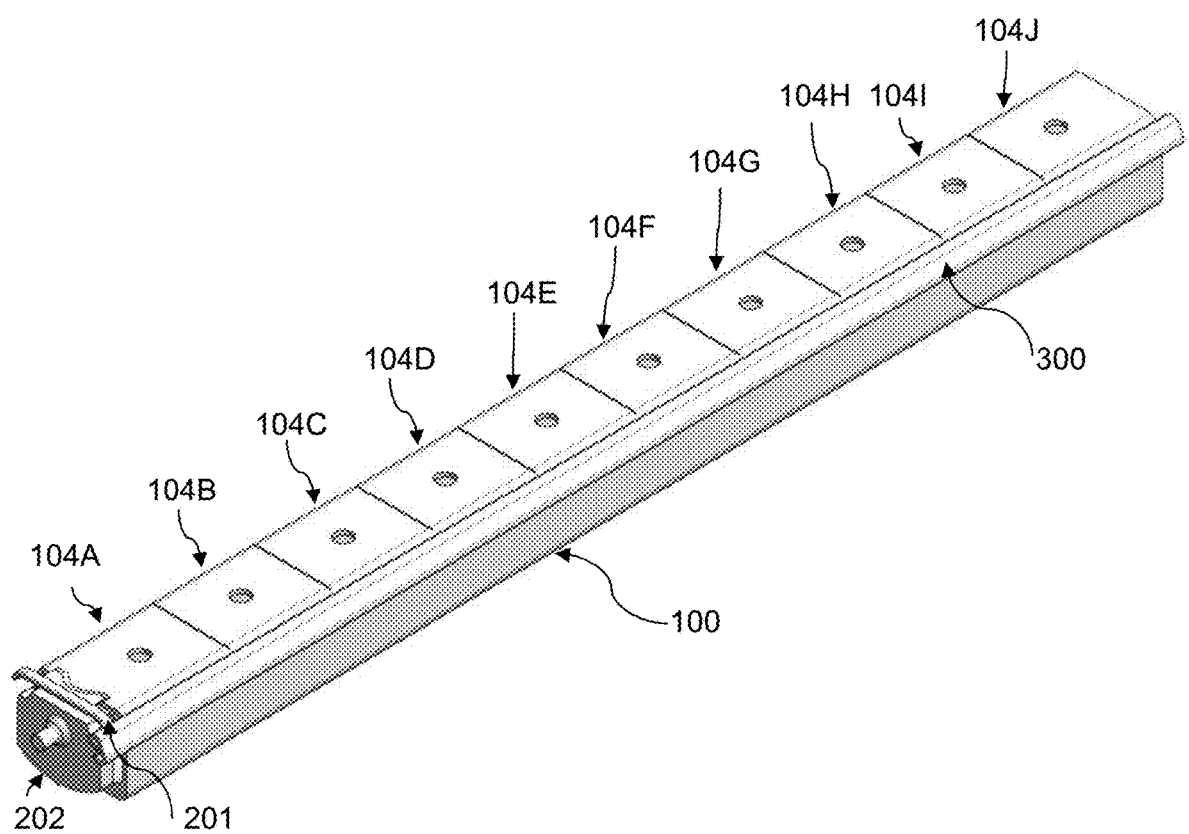
FIG. 8 shows a perspective view of a planter with a harvest tool, according to an embodiment of the disclosure with multiple growth units.

FIG. 8 shows a planter 100 with ten growth units 104A, 104B, 104C, etc., and a harvest tool 200 installed on a sliding rail 300.

Root Zone Plants

The design (e.g., size, dimensions) of a growth unit within a planter 100 (which may have multiple growth units) may be suitable for at least one shoot crop, at least one root crop, or both of at least one shoot crop(s) and at least one root crop(s).

A precise spray and drain process may control liquid flowing into and out of the planter 100. For example, a controller may be provided that controls a supply pump to supply liquid into the liquid supply lines embedded within the planter, and that controls a pump that draws or allows the drain line(s) to empty into the liquid container. By using the precise spray and drain process, water may be prevented from standing at the bottom of the growth units. In an embodiment, this process may ensure that is no standing liquid at the bottom of the growth unit. The precise spray and drain process may not only improve watering efficiency, but also increase healthy oxygen exchange to the roots and create a healthy growth environment for all root zone crops. The precise spray and drain process may have some residual water (e.g., in the trench), but still avoid the plant/plant roots being inundated with water, according to an embodiment.

Growth Unit Design

A size and a profile of a growth unit 100A can be designed in advanced. For example, different size and/or different profile of the growth unit 104A may be desired for different plants (e.g., based on one or more of: their shoot and root sizes, mature plant weight and how they are harvested and collected). One advantage of the planter of FIG. 8 is that the growth unit 104A can be designed once, and then, as shown in FIG. 8, one or more additional growth units (104B, etc.) can be added to the growth unit (by expanding the design of the planter 100 in a depth direction) with the exact same profile as 104A. By having the same (or a substantially similar profile), the harvest and cleaning processes can be automated (as a head of a plunger can be pushed through multiple growth units. FIG. 8 shows ten growth units (104A, 104B, 104C, etc.), but the number ten is only used as an example. Less than ten or more than ten (including one growth unit) may be provided by a planter 100.

When small plants are grown, a growth unit can be expanded both directions to provide space optimizations. Each plant location (growth unit) may have its own mist delivery spray nozzle, which provides a benefit of shoots and roots being able to be processed at a much faster higher rate.

Figure 9A:
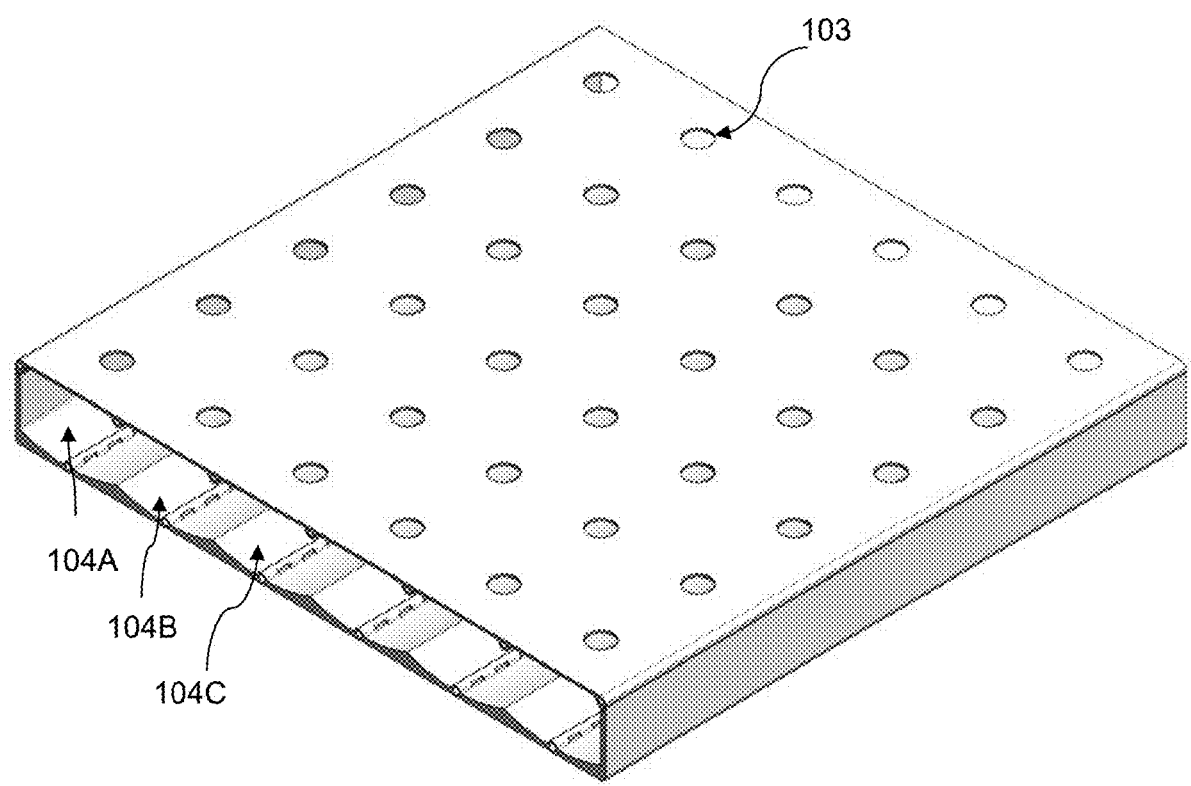
FIGS. 9A-9D show an expanded planter with an expanded growth units according to an embodiment of the disclosure.

While FIG. 8 shows ten growth units, FIG. 9A shows a perspective view of an expanded planter 1000 with an expanded growth area for smaller plants. As an example, FIG. 9A shows thirty-six growth units 104A, 104B, 104C, etc., each of the thirty-six growth units having their own hole.

The expanded planter 1000 may have similar features as the embodiments of the planter 100 of FIGS. 1-7. However, as shown in FIGS. 9A and 9B, expanded planter 1000 may also have one or more width-wise adjacent growth units in addition to (or instead of) the length-wise adjacent growth units (previously discussed with reference to FIGS. 5-7).

Figure 9B:
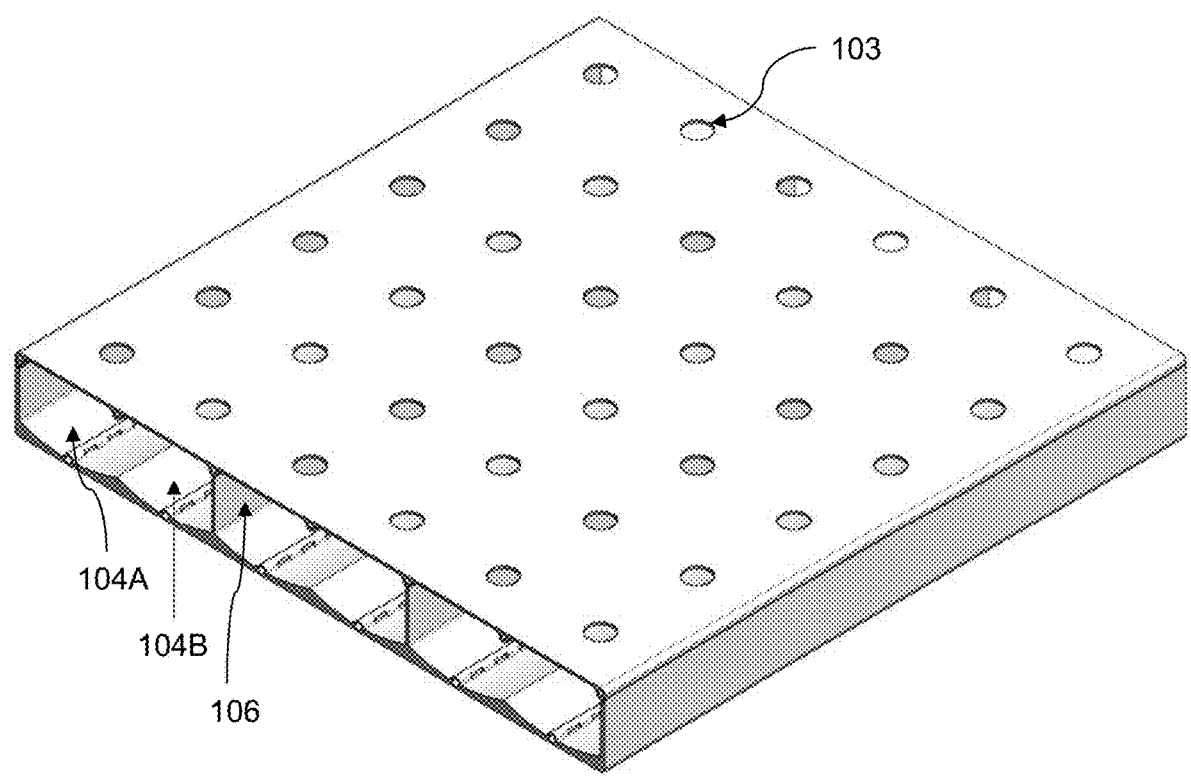
Figure 9C:
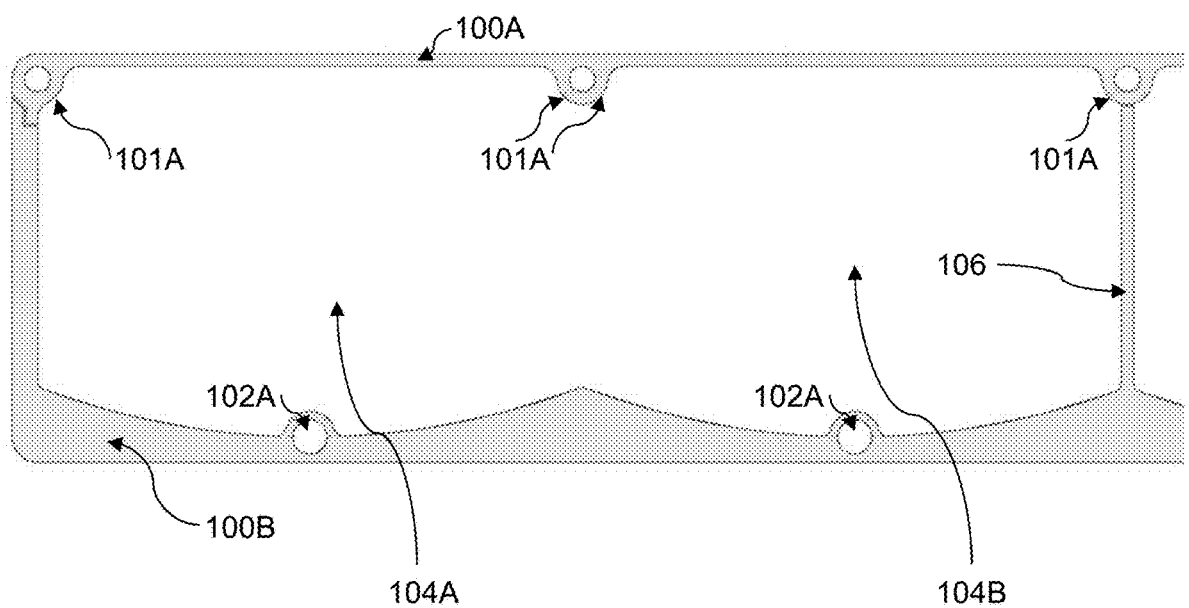

When plants have larger shoots and smaller roots, support walls 106 may be added to provide interior support for the expanded planter 1000, as shown in FIG. 9B. FIG. 9C shows a front view of an expanded planter 1000, showing interior features. In particular, FIG. 9C shows an expanded planter 1000 having two growth units 104A and 104B that are adjacent to each other in a width-wise direction. FIG. 9C shows a configuration, according to an embodiment, having three supply lines 101, five spray nozzles 101A, and two drain lines 102A. In this configuration, the spray nozzles may still be provided at the corner of the growth units 104A, 104B, etc. instead of (or in addition to) the corners of the planter 100/expanded planter 1000 itself.

Figure 9D:
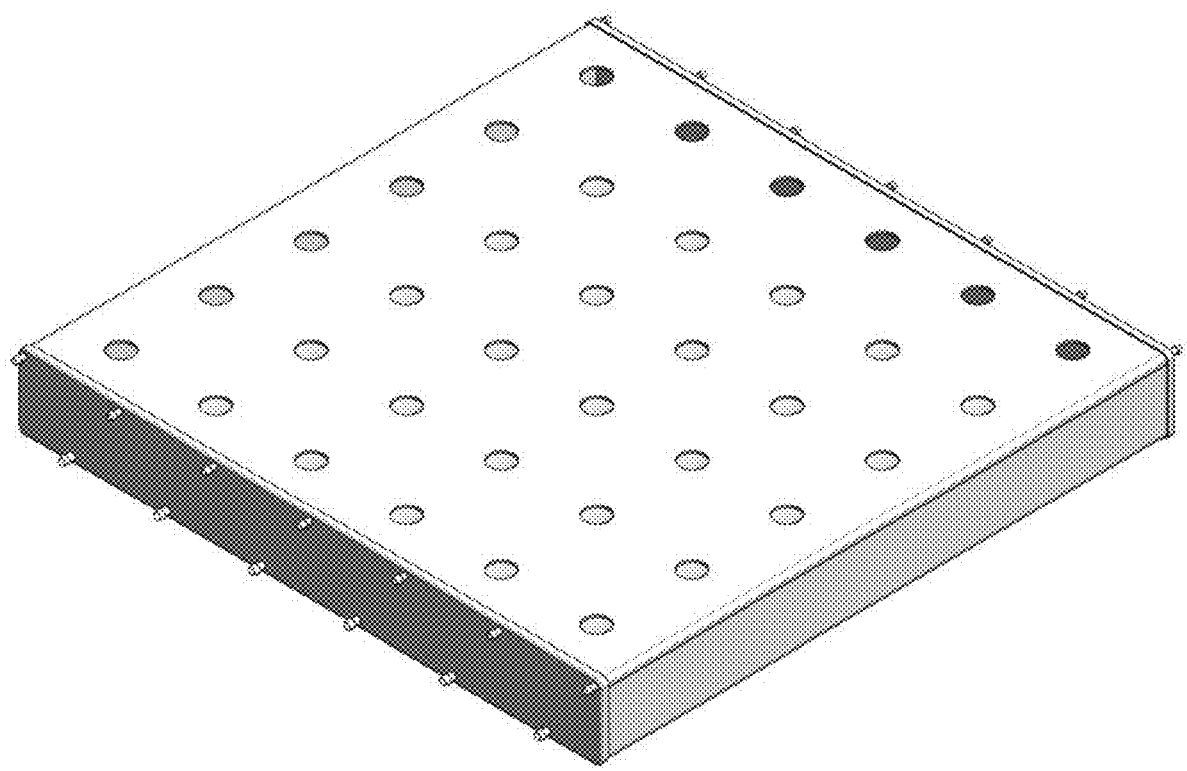

FIG. 9D shows a perspective view of an expanded planter 1000 with end covers, which may be similar as the end covers discussed above (except for the expanded size).

Growth Block

FIGS. 10A-10H show a growth block 5000. Growth block 5000 refers to a physical structure housing a group of planters 100 mounted on a conveyor in multiple layers. The conveyer belt 5001 may be controlled by a motor that is operated by a controller (e.g., a mechanical loop device) to carry planters 100 on it. Liquid lines 5002A, including both supply line and drain line, provided in liquid belt 5002. The liquid lines 5002A may connect via the connectors at both ends of the planters 100 to deliver water and liquid nutrients to the planters 100 and remove excess liquid from the planters, respectively.

The middle part of the growth block 5000 may be growth positions. The growth block 5000 may include lighting 5050 (e.g., light emitting diode (LED) lights 5050 over every planter 100 as shown in FIG. 10C). A wavelength of the LED lights may be changed by a control system to deliver an optimal growth environment. Planters 100 may be rolled in or out from growth positions. Each growth block 5000 may have a working deck for the operator to plant or harvest plants.

Figure 10A:
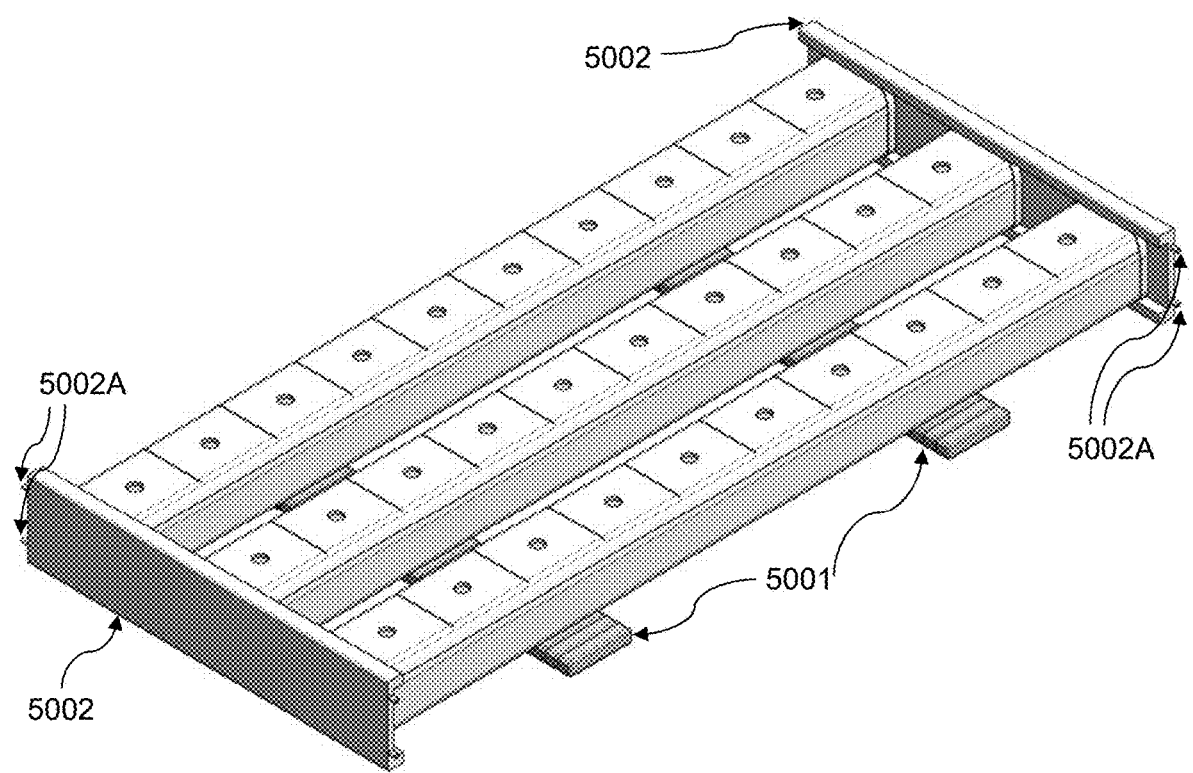
FIG. 10A shows plants installed on a conveyor belt.

FIG. 10A shows three planters 100 carried by two conveyor belts 5001. On both ends, the liquid belts 5002 are connected to each of the three planters 100.

Figure 10B:
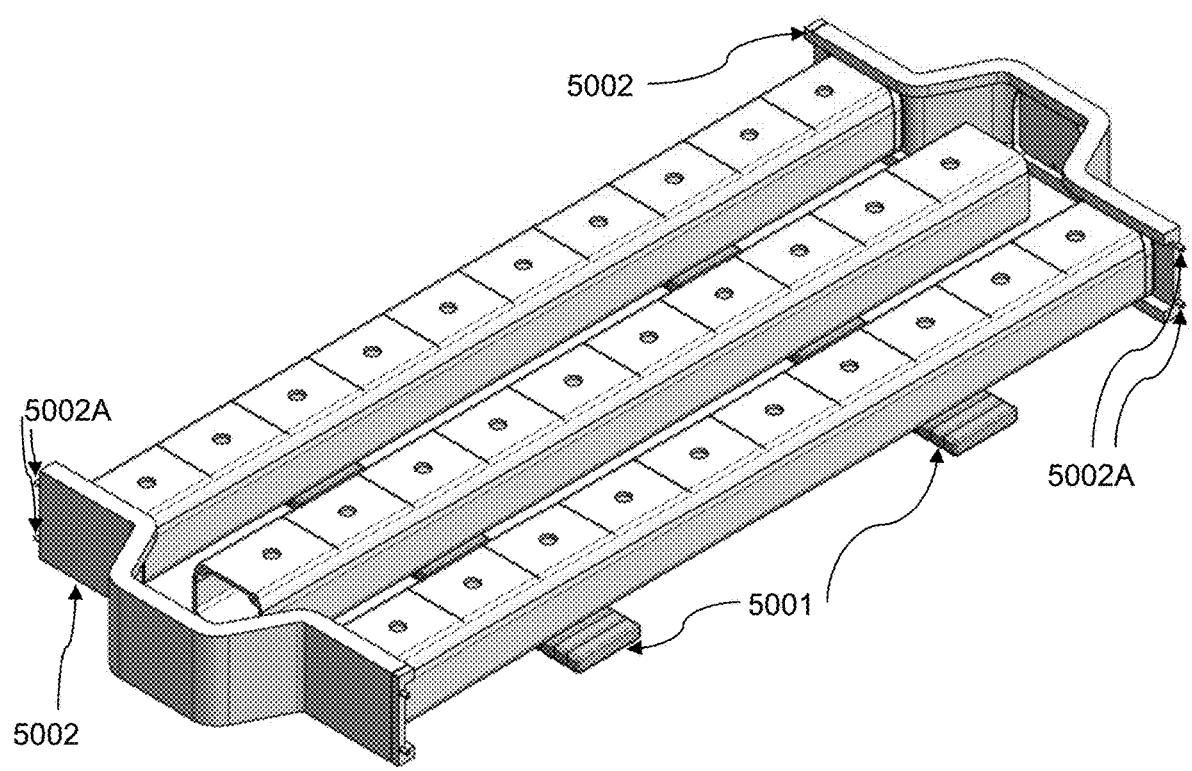
FIG. 10B shows liquid belt connection to the planter is separated when the planter is moved to working deck position.
Figure 10C:
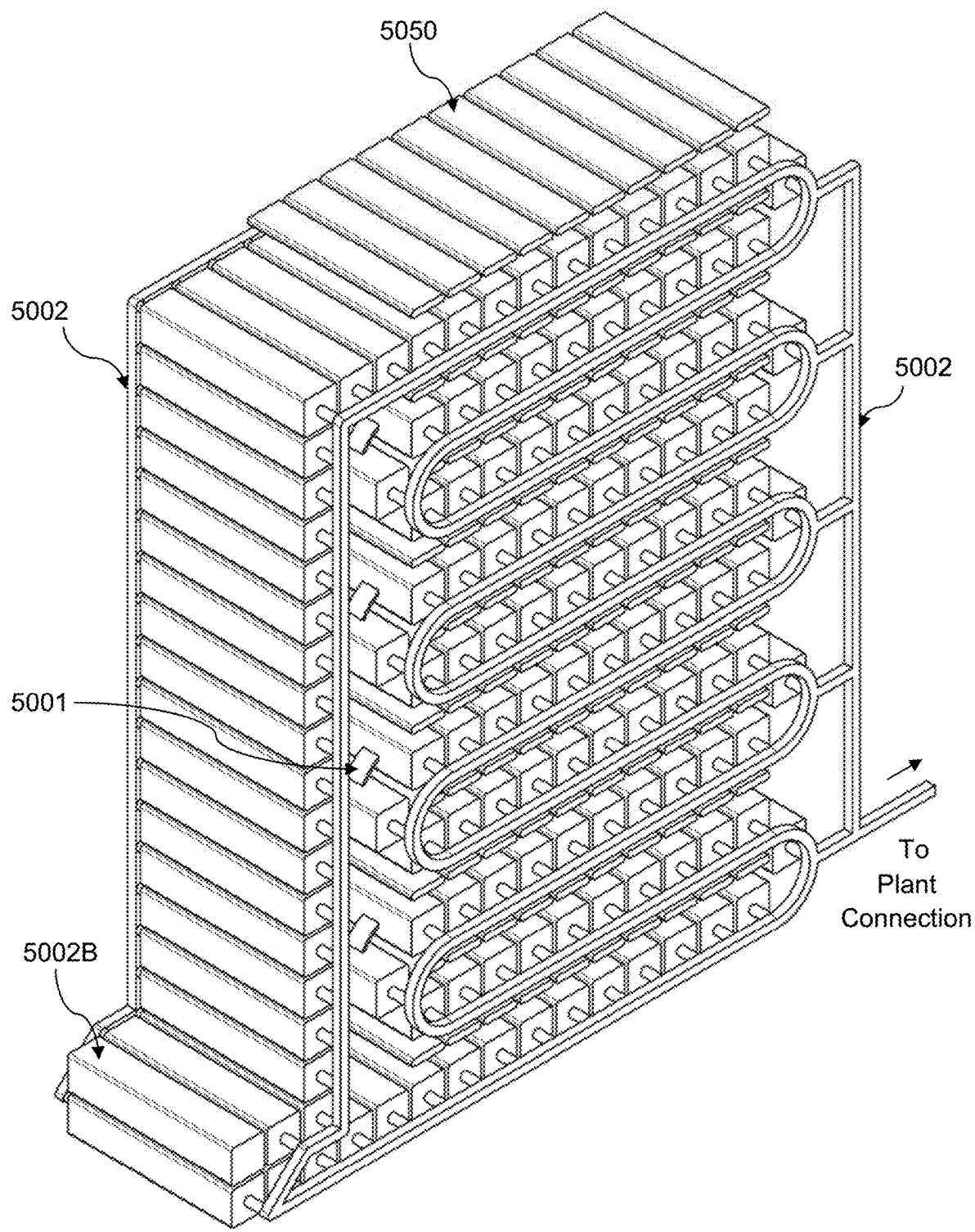
FIGS. 10C-10H show a growth block, according to an embodiment of the disclosure.

When the planter 100 is moved to a "working deck" position 5002B, the liquid belt 5002 connections on both ends may be separated, as shown in FIG. 10B. Three planter positions are shown in the growth block 5000 of FIG. 10B to demonstrate how the working deck works, according to an embodiment. However, other embodiments may include less than three planter positions or more than three planter positions. In practical design, the working deck may not in line with others. The conveyor belts 5001 carry the planter out of the loop of liquid belt 5002 and to the working deck for planting, harvesting and cleaning. When the process is completed, the conveyor belts 5001 carry the planter 100 back to the loop of liquid belt 5002. At the same time, liquid lines 5002A, inside of liquid belts 5002, will be connected to both ends of the planter 100. The growth block 5000 is meant for mass production, and to improve on the existing technological process, which was not suitable for mass production efficiently.

Figure 10D:
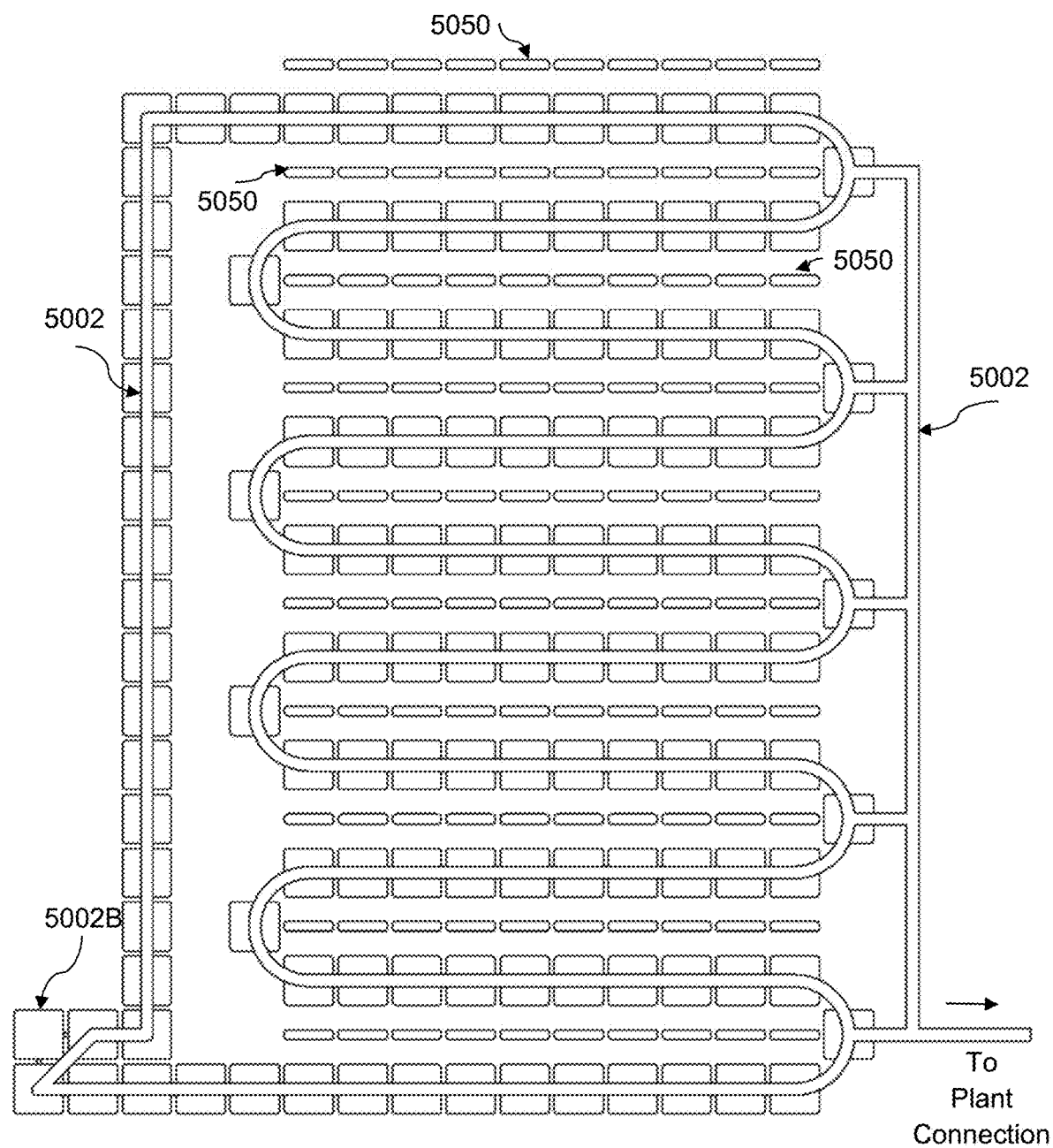

FIGS. 10C and 10D show perspective and side views of growth block 5000 with all planter positions filled with planters 100. Each long block represents a planter 100 and the space above for the plant shoots. The liquid belt 5002 may be connected to the planters 100 on each side of the growth block 5000. Each liquid belt 5002 of growth block 5000 may have a connection to the water and liquid nutrients supply and recycle system in the plant. The conveyor belt 5001 may carry the planters 100.

On the working deck position 5002B of the growth block 5000, the liquid belt 5002 may be separated from the planter 100. A harvest tool 200 may be applied either manually or by an automated process to cut, collect and pack crops and collect waste biomass. Then, new seedlings may be planted. When the planting is finished, the liquid belt 5002 may be applied and move to the next position on the conveyor belt 5001.

Growth Position(s)

Figure 10E:
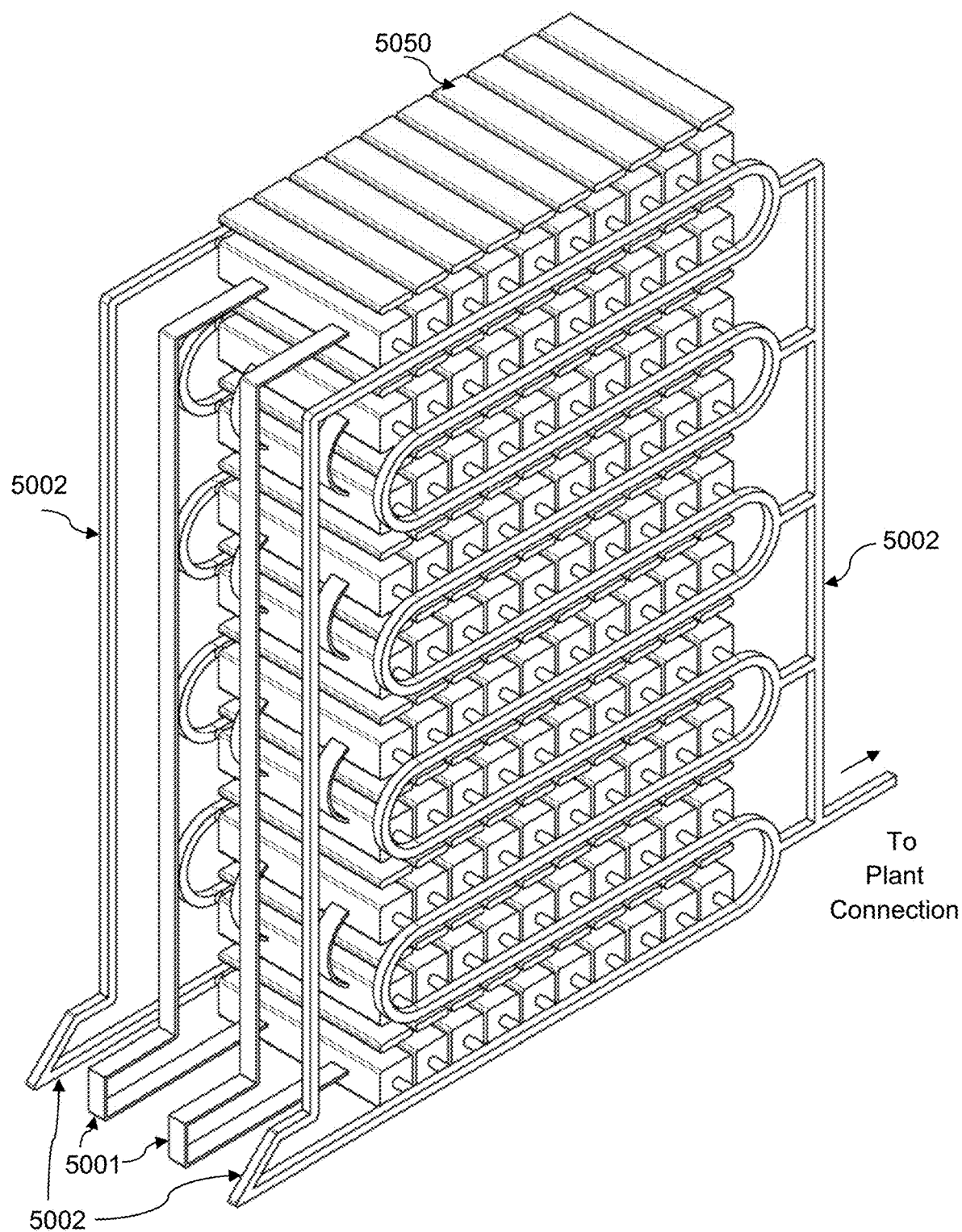
Figure 10F:
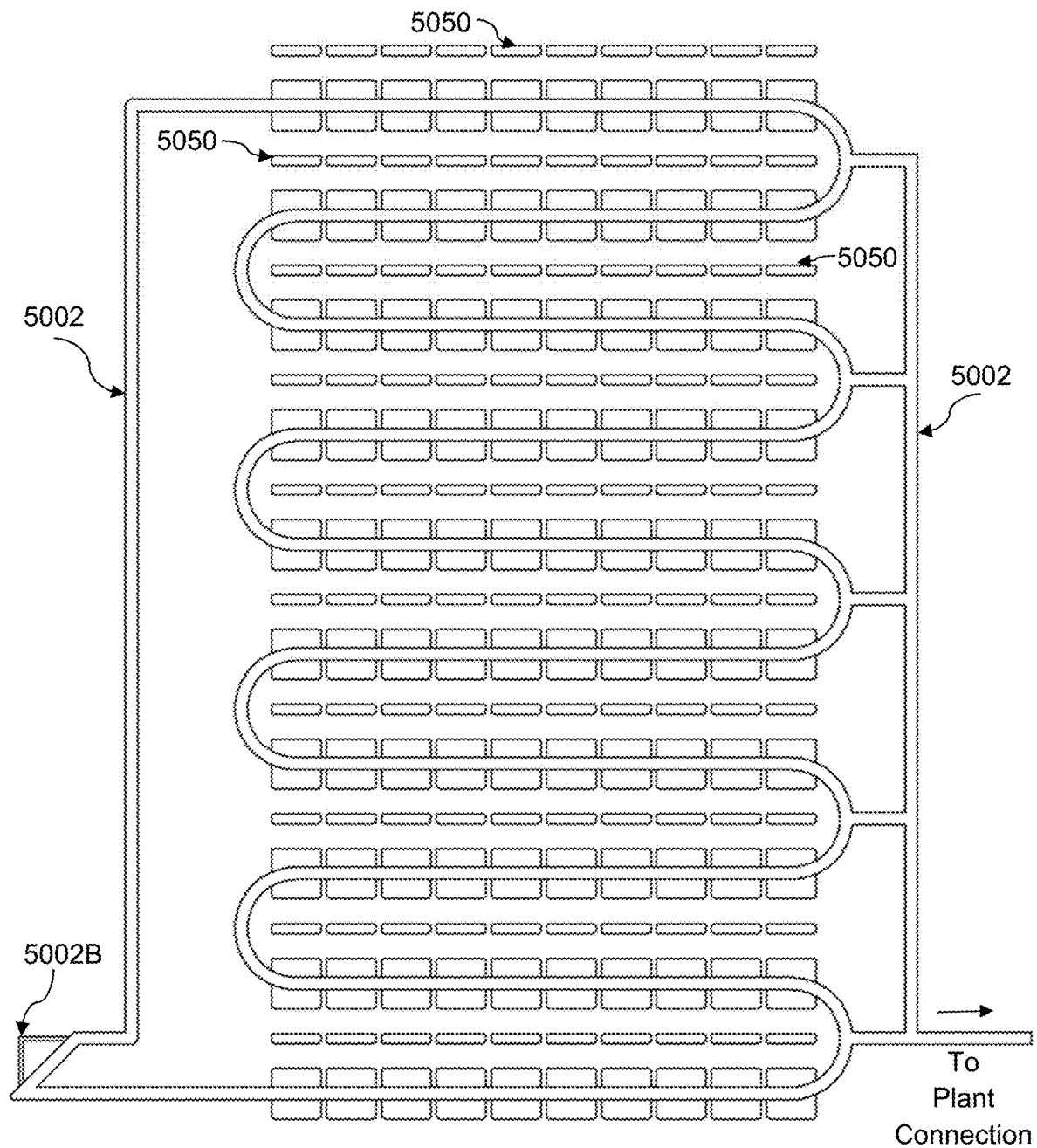

FIGS. 10E and 10F show perspective and side views of growth block 5000 with planters 100 in "growth" positions. According to an embodiment, in a full cycle, each of the planters 100 will, at some point in time, be positioned under a designated lighting area 5050 for a predetermined duration of time to ensure optimized growth conditions (e.g., appropriate intensity of lighting for the type of plant, temporal amount of lighting per day). All watering sequences may be controlled and managed by a control programs implemented by a controller or processor.

FIGS. 10E and 10F show the conveyor belt with no growth units on the open positions.

Harvest Position

Figure 10G:
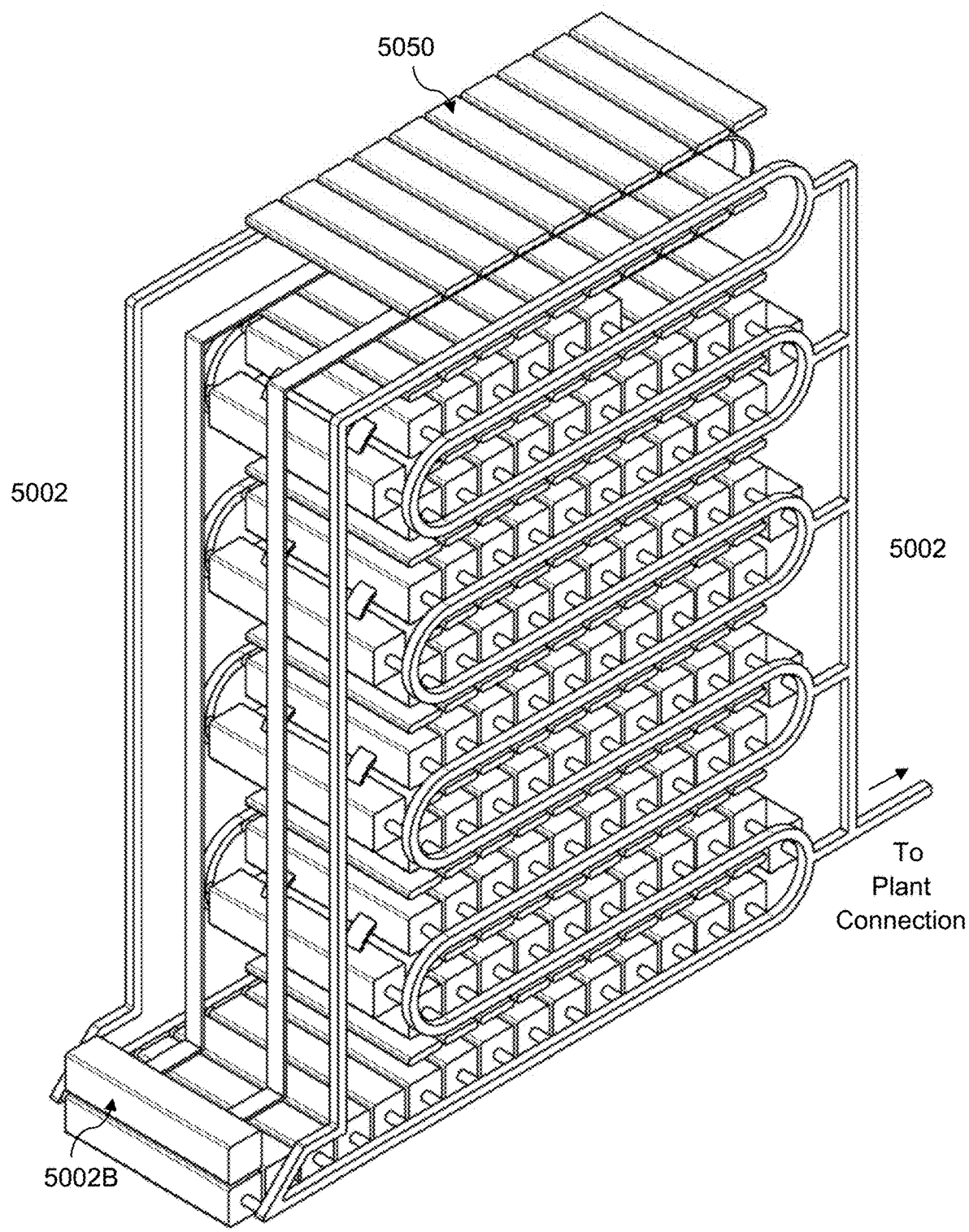
Figure 10H:
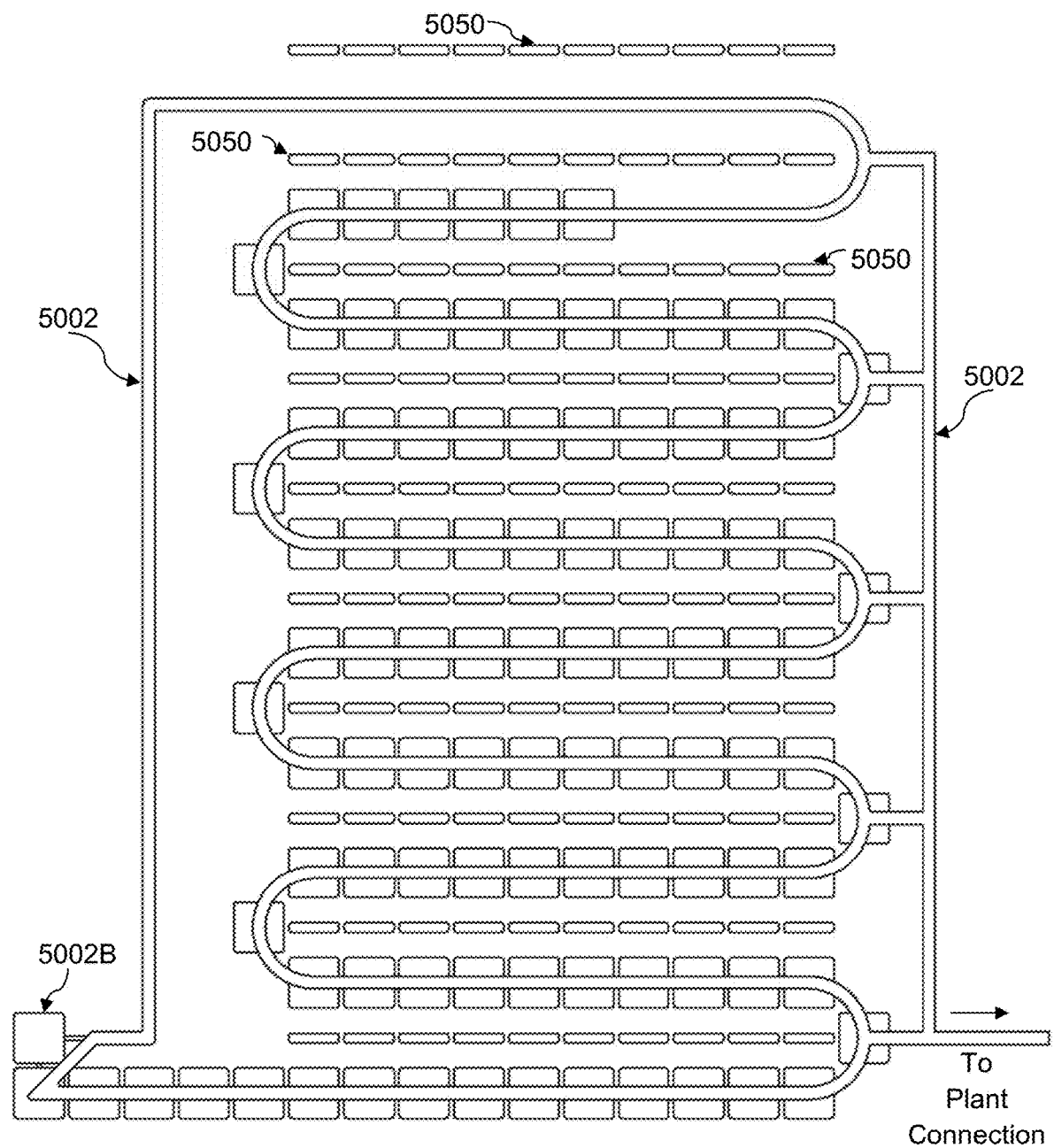

FIGS. 10G and 10H show perspective and side views of growth block 5000 with planters 100 that are in a position ready to be harvested while the first planter to be harvested reaches working deck position 5002B. FIG. 10G shows a perspective view of growth block 5000, showing conveyor belts, lighting and all positions planters may be required to be in. Each block may represent both planter 100 and corresponding shoot clearance space above.

FIG. 10H shows a side view of a growth block 5000, showing conveyor belts, lighting 5050 and all positions planters can be in. The first planter is in the working deck position, which is outside of liquid belt 5002 loop.

When a harvest program starts, the planters may start moving out of "growth" positions towards the working deck position 5002B.

FIGS. 10G and 10H show the first planter reaches the working deck position 5002B to be harvested. The rest of the planters may be moved along the conveyor belt 5001 down towards the working deck.

The liquid belt 5002 may be separated from the planter 100 before it reaches the working deck position 5002B (or it may be separated after the working deck position 5002B is reached).

Control System and Process

Figure 11:
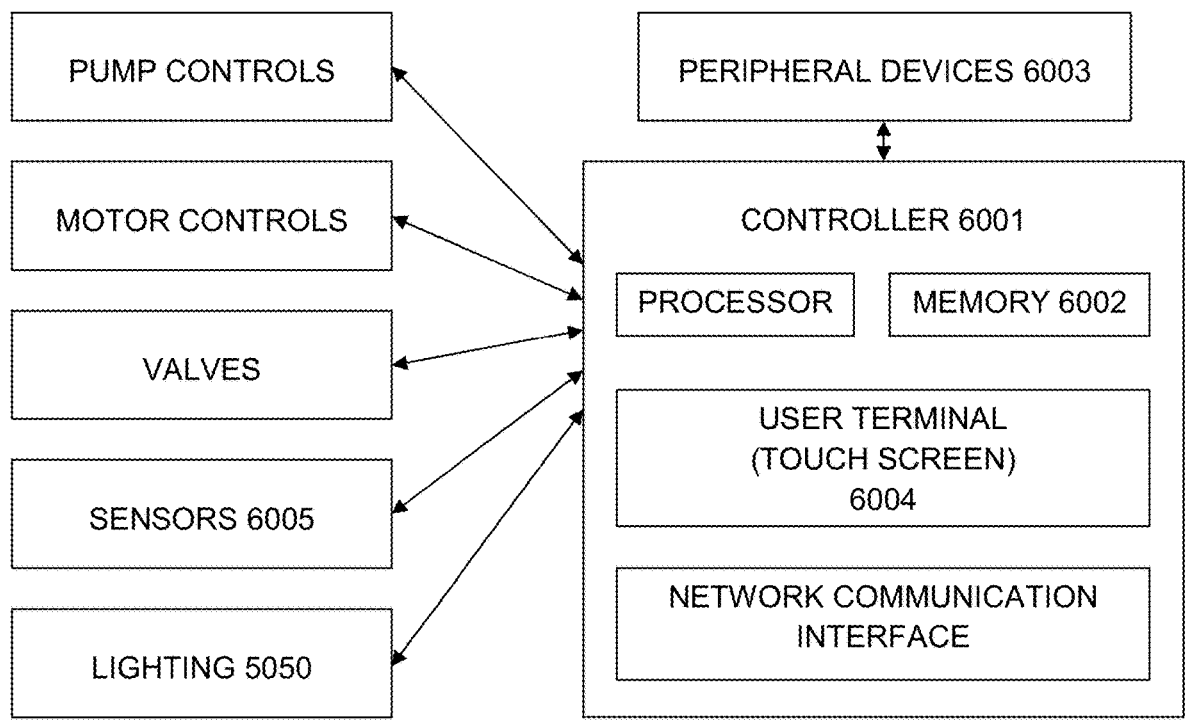
FIG. 11 shows a control system provided according to an embodiment.

According to an embodiment, a control system 6000 is provided as shown in FIG. 11. The control system 6000 may comprise a general or special controller 6001 and a memory (or memory device) 6002. The controller 6001 may be user operable via a peripheral input device (e.g., a mouse, a touch screen display, a keyboard) or via a user terminal device 6004. As shown in FIG. 11, the controller 6001 may include a processor.

The control system 6000 may comprise software and hardware for providing automation control. For example, the control system 6000 may include one or more of: digital sensor(s), an analog sensor(s), a transducer(s), a valve(s), a pump(s), a motor(s), or other control modules.

When a growth block is to be used, an operator may input (e.g., via peripheral devices 6003, via user input received via network communication terminal, or via a touch screen display input device 6004), a plant type. Based on receiving a user selection of the plant type, as user input, the controller 6001 may perform automation control based on the received user selection. The user terminal may be a computer or a mobile device (e.g., smartphone). The touch screen display may be a display that is fixedly mounted at a location near the growth block 5000 that is to be used. Near, in this context, means within a same room, or within at least a same facility. Based on receiving detection results from the one or more sensors 6005, the control system 6000 may detect whether a predefined threshold amount (e.g., which could be all) are in designated growth positions (e.g., a position on the conveyor belt where light adequately reaches the growth unit and/or the supply lines are connected (directly or indirectly). Based on detecting that the predefined threshold (e.g., all) of the planters are in the growth positions, the control system 6000 may direct water or liquid nutrients to the growth units using pre-programmed sequences processed by the controller 6001. The pre-programmed sequences may be stored in advance in the memory 6002. According to an embodiment, a table or database may store pre-programmed sequences in association with a corresponding plant type to facilitate the precise water and draining process.

The controller 6001 may also be connected to the LED lights 5050 and transmit control signals to the LED lights that cause the LED lights 5050 to perform control based on the transmitted control signals. For example, a control signal transmitted by the controller 6001 may cause the LED lighting 5050 to change color, dim, brighten, turn on or turn off.

The control system may actively monitor one or more of: ambient temperature, humidity and air quality (e.g., CO2 content) and make necessary automation control compensation as needed. The active monitoring may be performed based on sensor data related to one or more of temperature, humidity and air quality received by the controller 6001 from the one or more sensors 6005. The sensors 6005 may include a camera that captures images of the growth block 5000 and performs image recognition to recognize whether, for example, all of the planters 100 are positioned under the lights 5050 and performs automation control based on the results of the image recognition.

Pre-Programmed Automation Control Processes

The pre-programmed automation control processes may include one or more of: a planting process, a growing process, and a harvest process.

FIGS. 12-16 show flow charts that correspond to individual pre-programmed processes. Although FIGS. 12-16 are shown in detail, other embodiments of the disclosure may be realized without ever element of the flowcharts. The controller 6001 may be configured to perform each of the pre-programmed processes in FIGS. 12-16 or only a portion of them.

According to an embodiment, a graphical user interface may be presented to the user for selecting one of the pre-programmed processes. For example, according to an embodiment, when the controller is turned on, or when a user activates a specific application, the controller 6001 may transmit graphical user interface information which allows a user to select one of the programmed processes. However, in an embodiment, the user may be provided (either via the fixed display or user terminal) with the ability to perform automated control for a plant throughout, for example, the plant's life cycle, without needing to make a selection of one of the programmed processes.

1. Planting Process

Figure 12:
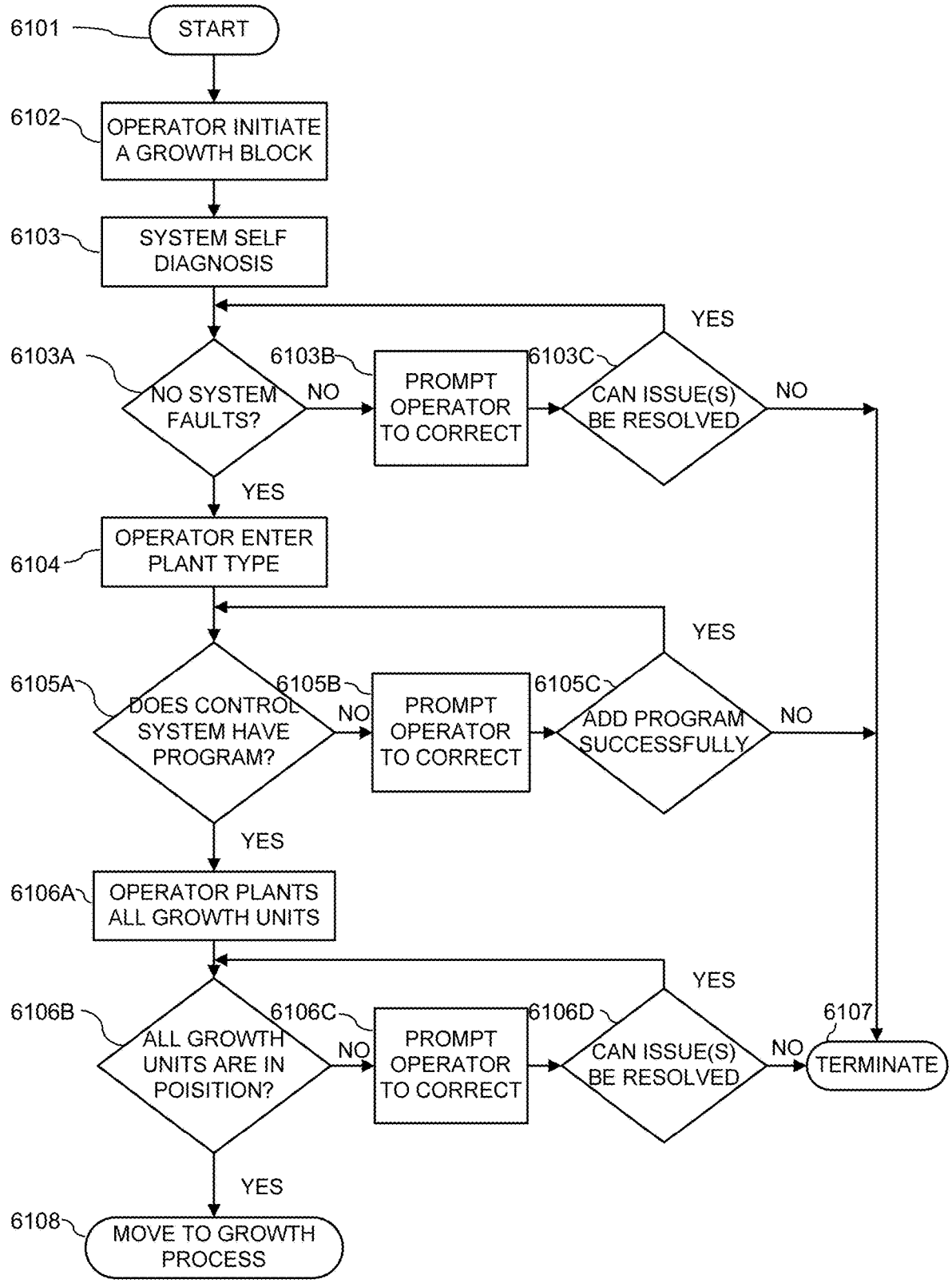
FIGS. 12-14 show various control programs that may be performed by the control system, the various control programs including a planting process, a growth process and a harvest process, according to an embodiment.

FIG. 12 shows a flow chart of a planting process 6100, according to an exemplary embodiment. The planting process 6100 may be performed by the controller 6001 when the user makes a selection corresponding to the planting process 6100. In operation 6101, the planting process 6100 may start after the user selection. In operation 6102, the controller may determine that the planting process is ready to begin. The determination of whether the plant process is ready to being may be based on a user input, or sensor information (e.g., image recognition and proximity sensing) information indicating that the planting process is ready to being. The reason for operation 6102 is that, after a planter is placed on the working deck of the growth block (e.g., by movement of the conveyor belt), the operator needs time to plant young seedlings (or seeds) into the through hole (with optional flexible holder(s) to secure the plant in place) before the automation control portion of the planting process begins. The conveyor belt may move the planters in the growth block one position at a time. Although other movements (e.g., multiple position changes at a time) may also be used. The controller may also apply the liquid belts and connect the liquid lines to the planter(s), or this could be performed manually. The liquid lines may include two supply lines and one draining line on the outside of the side cover.

Once the growth block is initiated (operation 6102), the controller 6001 may perform a self-diagnosis (6103), which may include detecting whether there are any system faults (6103A). If there is at least one system fault (6103A=No), then the controller 6001 may prompt the operator to correct (6103B), and determine whether the issue can be resolved (6103C). If the issue can be resolved (6103C=Yes), then the determination of any system faults in operation 6103A can be repeated. This loop can repeat indefinitely or for a predetermined amount of time (e.g., a timeout period). Once the system fault has been resolved (or if none was ever detected) (operation 6103=Yes), the controller 6001 may update the graphical user interface (GUI) so as to prompt the user to enter a plant type (operation 6104). However, the plant type may be determined in operation 6104 in other ways, such as, without prompt, but based on user input, or without prompt, where the plant type is predefined in advance, or is included with the selection process (e.g., when the user selects plant process, the type of plant is also included in the selection). In a mass production facility, the user entry steps may be minimized, according to an embodiment, and in some embodiments, non-existent.

Once the plant type is determined (operation 6104), the controller 6001 may determine whether an appropriate program for the determined plant type is stored in the memory 6002 (operation 6105A).

If an appropriate plant process program for the determined plant is not stored in the memory (6105A=No), the controller 6001 may prompt the user to correct (e.g., either by installing the programming, or downloading the program) in operation 6105B, and allow the user to successfully add the program (operation 6105C). If the user does not add a program (or does not do so within a predetermined amount of time) (6105C=No), the plant process may terminate (operation 6107).

If an appropriate program for the determined plant type is stored in the memory (6105A=Yes) or after the user adds a program (6105C=Yes) and now the appropriate program is stored (6105A is now=Yes), the controller may either automatically plant all growth units of the planter or allow the operator time to plant all growth units of the planter, and await an indication from the operator that all growth units are in position (6106A). Of course, the working deck may be configured to accommodate more than one planter, and so the planting of the planters may include planting multiple planters at a same time frame.

The controller 6001 may subsequently check whether all growth units are in position (operation 6106B). For example, the operation 6106B may be performed by using image recognition or sensor information. If 6106B=No (not all growth units are in position), the controller 6100 may prompt the operator to correct (or perform self-correction) in operation 6106C and determine whether the issue can be resolved in operation 6106D. If the issue is resolvable (6106D=Yes), then a repeat of operation 6106B may be performed. Operation 6106B may be tied to a certain condition (e.g., a predetermined number of attempts, or a predetermined amount of time) before the plant process terminates (operation 6107). If 6106D=No, the plant process may terminate (operation 6107).

If 6106B=Yes, the plant process may be complete (operation 6108). According to an embodiment, operation 6108 may include initiating a growth process 6200 (e.g., an automated growth process).

2. Growing Process

Figure 13:
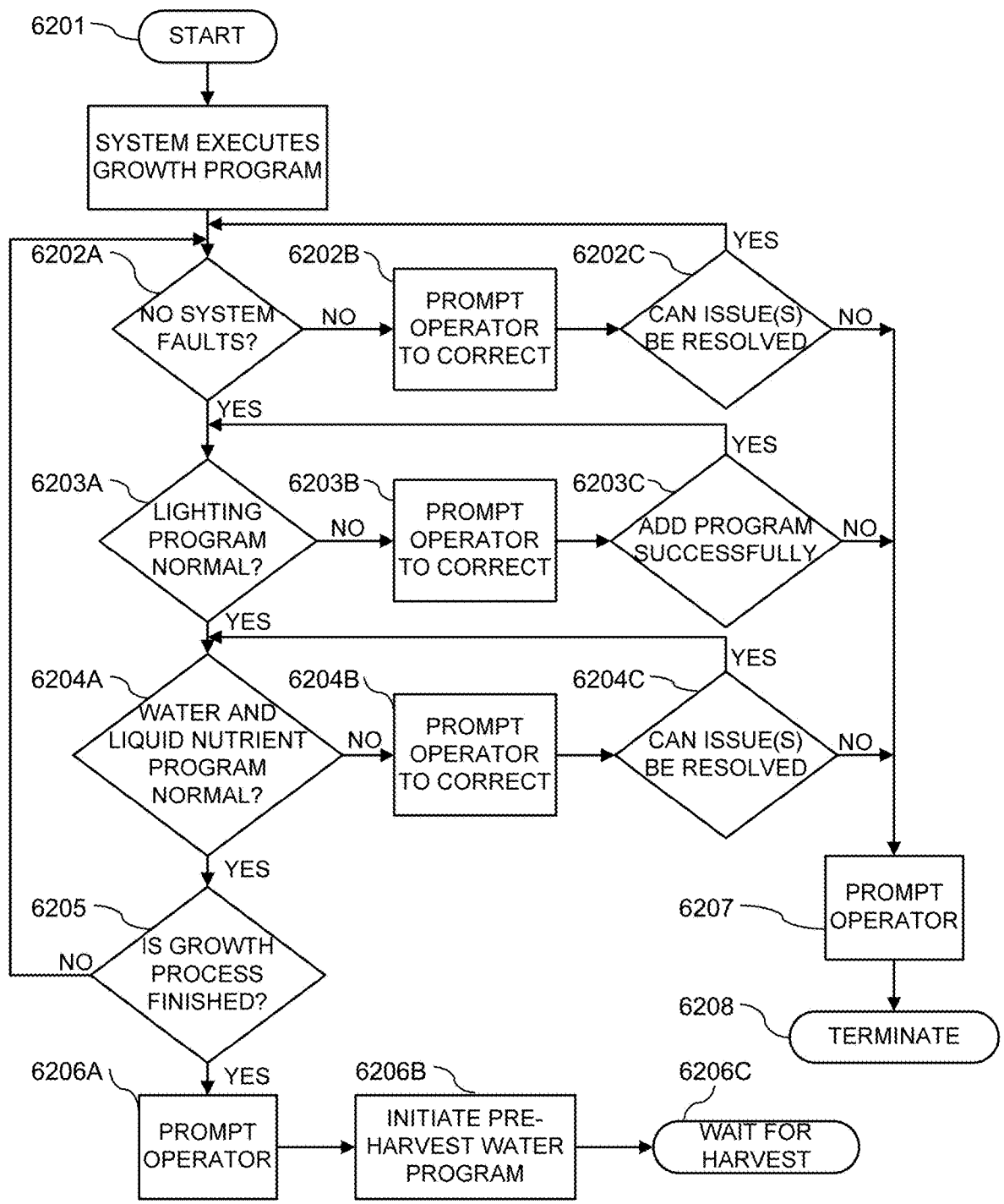

FIG. 13 shows a flowchart of a growth process 6200, which may be an automated growth process, according to an exemplary embodiment. The growth process 6200 may begin after, or include, the planters being moved into position by the conveyor belt until all positions are filled. The growth process may include the control system 6001 controlling timing and amount of water, liquid nutrients, etc., and the environment (e.g., humidity, temperature and $CO_2$ concentration in the area or building), a lighting frequency and a lighting intensity, based on what growing stage the plants are in, etc.).

According to an embodiment, each plant may have its own specific optimal growing needs and environment, thus each growth block may have the same plants (or plants from a same type of group) for easy control and best results.

According to an exemplary embodiment, the growth process, according to an exemplary embodiment 6200 may be performed by the controller 6001 when the plant process 6100 has completed successfully (operation 6201, in which controller 6001 may start execution of a growth program). However, the operation 6201 may also be performed when the user makes a selection corresponding to the growth process, and start after the user selection.

Next, the controller 6001 may perform a self-diagnosis, which may include detecting whether there are any system faults (6202A). Operations 6202A-6202C may correspond to Operations 6103A-6103C of FIG. 12 (discussed in detail above) and are not repeated here except for embodiments where they may differ.

For example, once the system fault has been resolved (or if none was ever detected) (operation 6202A=Yes), the controller 6001 may not provide a user prompt. Instead, the growth program may be re-started. The growth program is discussed more in detail with regard to FIG. 13 below.

The growth program may also perform additional checks regarding the growth block. For example, operations 6203A-6203C correspond to a check on the lighting: 6203A (check whether lighting is normal); if lighting is not normal (6203A=No), prompt operator to correct (6203B), and determine if a program has been added successfully (6203C).

Operations 6204A-6204C may be the same or similar operations as in 6203A-6203C, but directed at the liquid supply control. In particular, operations 6204A-6204C may include checking whether the water and liquid nutrient program is normal (6204A), if the liquid nutrient program is not normal (6204A=No), the operator may be prompted to correct (e.g., prompted to enter a program) in operation 6204B, and a check whether the issue has been resolved (e.g., by downloading of a better program, or by filling nutrients or water levels of a supply container) in operation 6204C. Any of 6202A, 6203A or 6204A operation may have unresolvable issues. In response to an unresolvable issue, the controller 6001 may notify an operator (6207) and, if still not resolved, terminate the program (6208).

Operations 6205 checks whether the growth process has finished. For example, the growth process may be set to run for a predetermined amount of growing cycle (e.g., 2 weeks, 4 weeks or 3 months, etc.) and operation 6205 may equal Yes, when the growth program has run for the predetermined amount of time. The amount of time the growth program has run may be equal to the amount of time from when the growth program first began, or may equal the amount of time from when the growth program first began minus any stoppages (or an intermediate offset based on stoppages).

If the growth process has finished (Operation 6205=Yes), the growth process may successfully end, and the operator may be prompted (6206A) inquiring whether the operator would like to initiate a pre-harvest water program. If the operator acknowledges (6206A=Yes), the pre-harvest water program may be initiated (6206B).

After operation 6206B, the controller 6001 may wait for the harvest (operation 6206C), such as, by setting a timer, or time-based event, or an image-recognition based event.

3. Harvest Process

Figure 14:
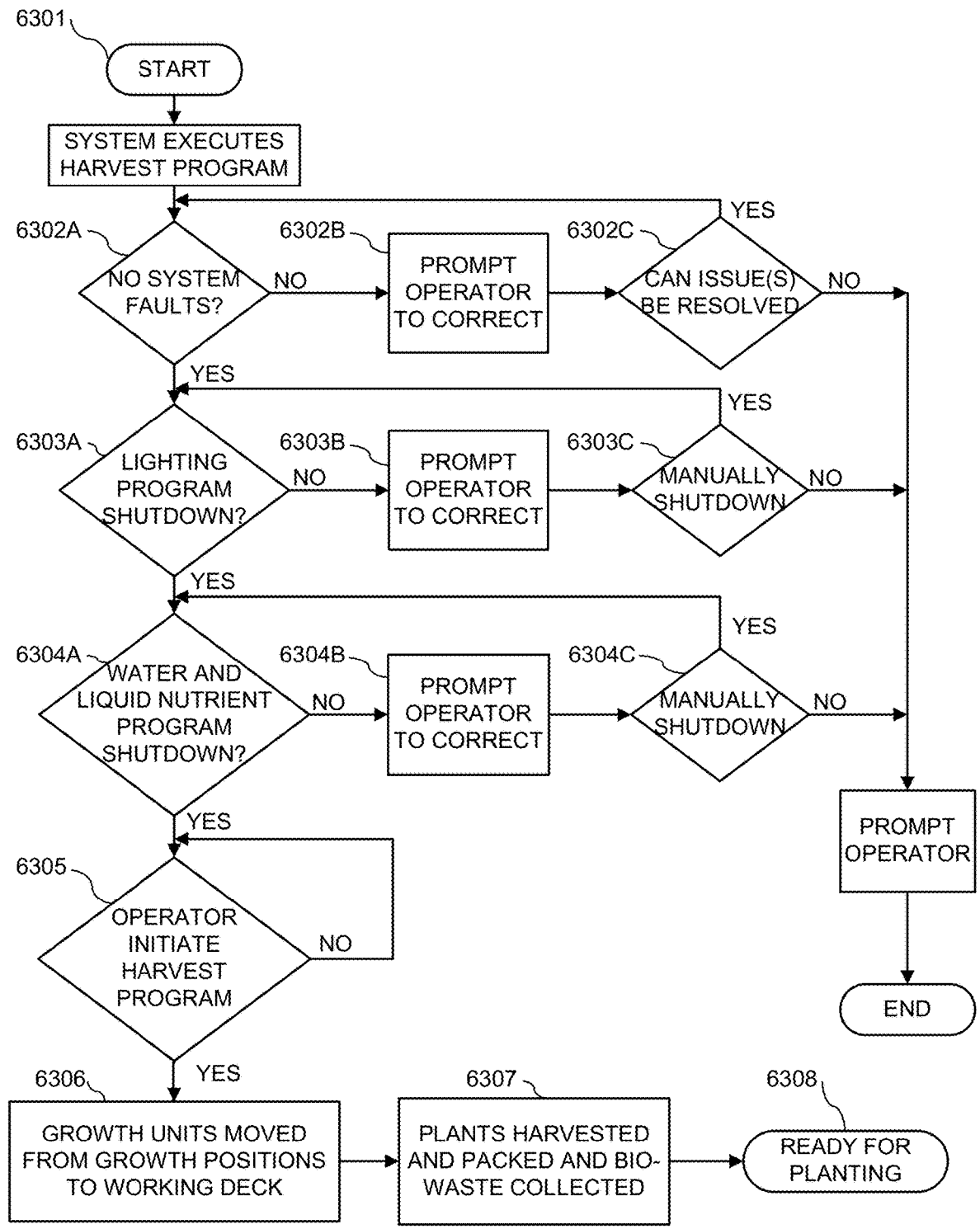

FIG. 14 shows a flow chart of a harvest process 6300 according to an embodiment of the disclosure. The harvest process may be performed when the plant is mature and ready to be harvested. At that time, the controller may be triggered to start execution of the harvest program (operation 6301). The controller 6001 may perform self-diagnosis and check system faults (operations 6302A-6302C), are similar or the same as the self-diagnosis and check system faults described earlier.

In operation 6303A, the controller 6001 may determine whether the lighting has been shut down. If the lighting has not shutdown (6303A=No), the operator may be prompted to correct the shutdown (6303B) by performing a manual shutdown. If the manual shutdown has occurred (6303C=Yes), or the lighting was already shutdown automatically (6303=Yes), the harvest program may continue.

In operation 6304A, the water and liquid nutrient program is checked for shutdown and manual shutdown may occur, if it has not. In this regard, operations 6304A-6304C are similar to operations 6303A-6303C except that the water and liquid nutrient program is checked for shutdown/manual shutdown in Operations 6304A-6304C.

These shutdown operations do not have to be presented in the order described, and the order described is merely used for illustrations. The self-diagnosis check could be performed in a different order in the operations or not at all (e.g., not at all during the harvest process).

In operation 6305, a prompt may be given that waits for the operator to initiate the harvest program. When user input is received indicating the harvest program should be initiated (6305=Yes), the harvesting portion of the harvest process may begin.

The harvesting portion of the harvest process may include spraying water to the roots to ensure there is no leftover liquid nutrient on the roots. However, this process may also be included in the water and liquid nutrient program shutdown procedure.

The timing of the harvest may be based on a cycle that also allows plants to have time to break down and fully convert the liquid nutrients applied.

The harvesting portion of the harvest process may include moving the planters from growth positions to working deck (operation 6306). When the planter is moved from its growth position to the working deck, the liquid belt may be moved away to leave both ends open (either manually or automatically).

In operation 6307, a harvest tool may cut, collect and pack a portion of a plant. For example, the harvest tool may cut, collect and pack shoots of plant and push out and collect residual biomass in the planter. If the plant roots are to be harvested, the harvest tool cuts, collects shoots as biomass and pushes out and processes roots for packaging.

Now, the planter (and individual growth units) is/are cleaned and ready to accept new batch of young seedlings (operation 6308). That is, the operator could now repeat operation 6101 so that the planting process 6100 may start after a second user selection. In a second planting process, the operator may choose a new plant type or use the same kind as in a first planting process.

As shown in FIGS. 13 and 14, if an issue cannot be resolved (e.g., manual shutdown has not or cannot be performed, or a system fault is not resolvable), prior to termination, the operator may be prompted with information regarding the reason that the program is going to terminate prior to actually terminating. This prompt may occur after a predetermined amount of time after the user has been given a prompt regarding correcting the issue.

Figure 15A:
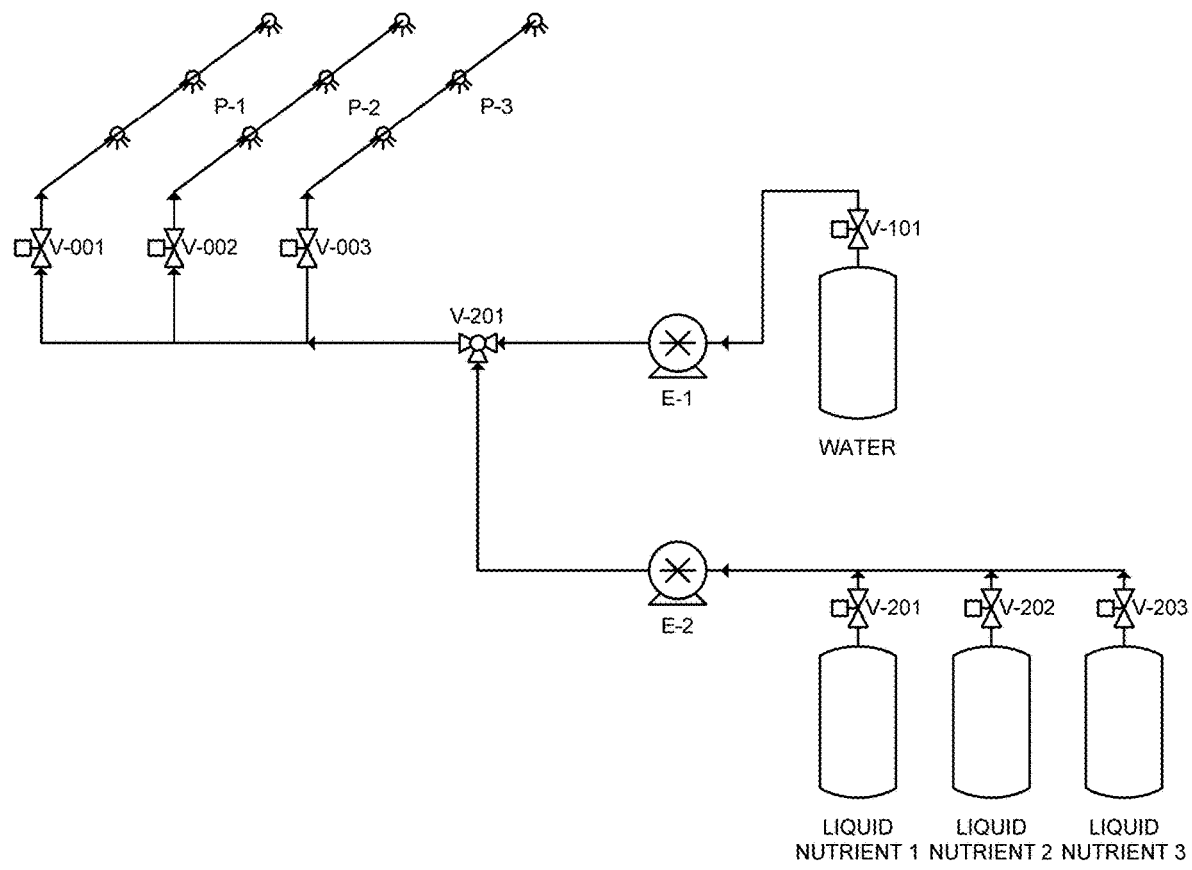
FIG. 15A shows a delivery flow diagram of a water and liquid nutrients supply system 8000 according to an embodiment.

FIG. 15A show a delivery flow diagram of a water and liquid nutrients supply system 8000 according to an embodiment. P1, P2 and P3 shows misting pipes in a planter 100 or expanded planter 1000. The above mentioned spray nozzles may be precisely sized spray nozzles at each growth unit location. The water or liquid nutrients may be delivered through these orifices in form of mist to the plant roots.

V1, V2 and V3 represents electronically controlled 2-way valves for each planter. The use of the valve for each planter is to provide capability of isolating one or more planters from the growth block to perform maintenance tasks. V4 represents an electronically controlled 3-way valve for selecting either water or liquid nutrient. The valves V1-V8 of the water and liquid nutrients supply system 8000 may be opened and closed based on control performed by the controller 6001.

V5 represents electronically controlled 2-way valves for water tank. E1 represents a positive displacement pump to deliver water supply.

V6, V7 and V8 represent electronically controlled 2-way valves for different liquid nutrient tanks. E2 represents a positive displacement pump to deliver one of the liquid nutrients.

When the water is needed for the planter, V4 may be turned on to make the supply line open to water supply side. E1 and V5 may be turned on by the control system. The valves V1-V8 may be opened and closed based on control performed by the controller 6001 in accordance with a pre-stored automation program, based on active real time user input, or based on monitoring the sensor(s).

When one specific liquid nutrient is needed for the growth unit, V4 will be turned on to make the supply line open to liquid nutrient supply side. E1 and V5 are kept off and E2 and one of the V6, V7 or V8 will be turned on by the control system.

Figure 15B:
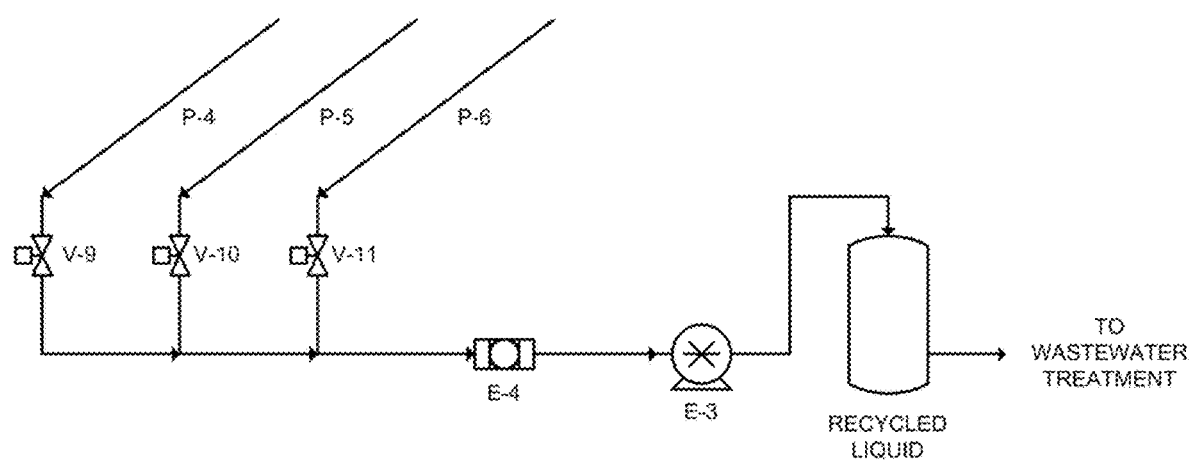
FIG. 15B shows water and liquid nutrients recycle system 9000, according to an embodiment.

FIG. 15B shows water and liquid nutrients recycle system 9000. P4, P5 and P6 shows liquid collection trench in planter. Any excessive water or liquid nutrient used in planter will be collected here. Periodically, the liquid will be removed from planters.

V9, V10 and V11 represents electronically controlled 2-way valves for each planter. The use of the valve for each planter is to provide capability of isolating one or more planter from the growth block to perform maintenance tasks. E4 represents an inline filter to remove debris from the process. E3 represents a positive displacement pump to remove excessive liquid in the growth units.

When the liquid level is detected high in the planter (or on a pre-programmed interval), V9, V10, or V11 and E3 may be turned on by the controller 6001 to remove excessive liquid.

The liquid may be collected in recycled liquid tanks for further tests and treatment.

The humidity level inside of the one or more planter may be monitored by humidity sensors. When humidity level drops below a predetermined level, the controller 6001 may start another watering sequence.

Computer software to perform one or more of the above operations be coded using any appropriate computer programming langue or code, which may be complied, linked or assembled to create code comprising computer code or instructions that can be executed by one or more processors. The order of the operations described above is exemplary in nature, and the operations may be performed in different orders. The order of operations is not limited by the FIGS. or specification. For example, the shutdown checks (water and lighting) can be performed in different orders or simultaneously without deviating from the intended purpose of the disclosure.

While the disclosure describes several exemplary embodiments, there are various equivalent substitutes, and modifications, which are within the scope of the present disclosure. Those of ordinary skill in the art will be able to appreciate different embodiments, although not expressly disclosed or shown in the present disclosure, embody concepts in the disclosure and are thus within the scope of the disclosure.

The invention claimed is:

1. A planter comprising:
    a housing configured to house one or more growth units, which are individual positions in the planter for growing an individual plant;
    one or more embedded liquid supply lines embedded to be built entirely within one or more walls in an upper portion of the housing;
    one or more spray nozzles built in the one or more walls and configured to deliver water or liquid nutrients directly, from the one or more liquid supply lines, to roots of the plant at an angle to a vertical direction;
    a drain line embedded in a lower portion of the housing; and
    a drain that is configured to remove liquid from the planter, wherein
    the one or more supply lines are configured to supply liquid from a supply pump to an interior chamber of the planter, and
    an upper surface of the housing of the planter includes through holes that pass through the upper surface of the planter housing into the interior chamber of the planter; the through holes respectively configured for each of the one or more growth units; a harvest tool, wherein the harvest tool comprises a cutting blade, and the harvest tool is configured to cut an upper portion each of the at least one plant, when the harvest tool moves in one direction; wherein the harvest tool further comprises a plunger that has a head portion having a shape that corresponds to an interior cross section of the planter such that the plunger is configured to push out a root portion of each of the at least one plant, which were each cut by the cutting blade, in the one direction, when the plunger moves through an inside of the planter, as the harvest tool moves in the one direction; a guiding wheel and a sliding rail, wherein the harvest tool is mounted on the guiding wheel, the guiding wheel is installed on the sliding rail, which is located along side of the planter, and the guiding wheel moves along the sliding rail causing the harvest tool to slide in a same direction as the guiding wheel moves along the sliding rail.

2. The planter of claim 1, wherein the through holes comprises at least two through holes, and each of the at least two through holes is positioned on a same horizontal plane.

3. The planter of claim 1, further comprising the one or more growth units, wherein the one or more growth units includes at least two growth units.

4. The planter of claim 3, wherein each of the interior chambers corresponding to the at least two growth units have same dimensions with regard to height and width such that a head of a tool having a same dimension minus a threshold margin fits into each of the interior chambers corresponding to the at least two growth units, thereby making the planter compatible with an automated harvest and cleaning process.

5. The planter of claim 3, wherein the drain includes a plurality of drains including one drain for each of the at least two growth units.

6. The planter of claim 1, further comprising a cover covering an end of the housing, wherein the one or more supply lines comprises two supply lines, and the cover comprises two tubes provided within cover, the two tubes connected to the two supply lines.

7. The planter of claim 6, further comprising the one or more growth units, wherein the two built-in tubes include a first built-in tube located at a top right area of the one of the one or more growth units, and a second built-in tube located at a top left area of the one or more growth units.

8. The planter of claim 1, further comprising the one or more growth units, wherein the one or more built-in spray nozzles are respectively provided at each location of the one or more growth units.

9. The planter of claim 1, further comprising the one or more growth units, wherein a size of each of the one or more growth units in a planter corresponds to an anticipated size of roots of an individual plant.

10. The planter of claim 1, further comprising a trench for collecting condensation drips from roots, wherein
    the trench is located at a bottom of the lower portion of the housing of the planter, and
    the drain is located in the trench.

11. The planter of claim 1, further comprising the one or more growth units, wherein the one or more growth unit comprise at least two columns of growth units and at least two rows of growth units.

12. The planter of claim 1, wherein the one or more supply lines comprise a plurality of supply lines entirely embedded in one or more of the walls in the upper portion of the housing.

13. The growth system of claim 1, further comprising a processor and a motor, wherein the processor is configured to drive the motor so as to automatically control a sequence of watering, fertilizing, lighting and when to move the planter and the another planter to the working deck, based on a plant type.

14. A growth system comprising:
the planter of claim 1;
a first pump, which is the supply pump; and
a second pump, which removes liquid from the planter.

15. A growth system comprising:
the planter of claim 1;
a processor; and
a motor, wherein the processor is configured to drive the motor so as to move the harvest tool so that the harvest tool automatically separates an upper portion of each of the at least one plant from a lower portion of each of the at least one plant.

16. A growth system comprising:
the planter of claim 1; and
another planter that is configured to house at least one other one plant, the another planter having the same dimensions and configuration as the planter.

17. The growth system of claim 16, further comprising a processor,
a motor and a
conveyor belt, wherein
the planter and the another planter are mounted on the conveyor belt,
the processor is configured to drive the motor to move the conveyor belt so that the planter moves from a first position to a second position,
the first position is a position of a working deck for planting, harvesting and cleaning, and
the second position is a position other than the position of the working deck, which is one of an intermediary position or a growth area position.

18. The growth system of claim 17, wherein the second position is the growth area position;
further comprising a plurality of light emitting diode (LED) lights that are configured to provide light while the planter or the another planter is in the growth area position of the conveyor belt.

* * * * *